United States Patent
Richards

(10) Patent No.: US 12,549,264 B1
(45) Date of Patent: Feb. 10, 2026

(54) METHOD AND SYSTEM FOR CALIBRATING ANTENNAS WITH APPLICATION TO SOLAR POWER SATELLITES

(71) Applicant: Chester Richards, Thousand Oaks, CA (US)

(72) Inventor: Chester Richards, Thousand Oaks, CA (US)

( * ) Notice: Subject to any disclaimer, the term of this patent is extended or adjusted under 35 U.S.C. 154(b) by 0 days.

(21) Appl. No.: 19/335,564

(22) Filed: Sep. 22, 2025

Related U.S. Application Data

(60) Provisional application No. 63/697,946, filed on Sep. 23, 2024.

(51) Int. Cl.
| | |
|---|---|
| *H04B 17/00* | (2015.01) |
| *H04B 7/024* | (2017.01) |
| *H04B 17/12* | (2015.01) |
| *H04B 17/21* | (2015.01) |

(52) U.S. Cl.
CPC ............. *H04B 17/12* (2015.01); *H04B 7/024* (2013.01); *H04B 17/221* (2023.05)

(58) Field of Classification Search
CPC ....... H04B 17/12; H04B 7/024; H04B 17/221
See application file for complete search history.

(56) References Cited

U.S. PATENT DOCUMENTS

| | | | |
|---|---|---|---|
| 3,781,647 A | 12/1973 | Glaser | |
| 6,492,586 B2 | 12/2002 | Mikami et al. | |
| 11,736,209 B1* | 8/2023 | Bar Shalom | H04B 17/12 455/63.4 |
| 2019/0373569 A1* | 12/2019 | Ram | H04W 56/005 |
| 2025/0015906 A1* | 1/2025 | Sridharan | H04B 17/21 |
| 2025/0227630 A1* | 7/2025 | Huang | H04B 17/25 |
| 2025/0260469 A1* | 8/2025 | Marr, Jr. | H04B 7/06956 |

OTHER PUBLICATIONS

Dudenhoefer et al., "Space Solar Power Satellite Technology . . . ," NASA Glenn Research Center, NHTC20000-12067, Aug. 2000.

(Continued)

*Primary Examiner* — Ping Y Hsieh
(74) *Attorney, Agent, or Firm* — Cislo & Thomas, LLP

(57) ABSTRACT

This invention employs a novel method of phase calibrating a very large distributed antenna. The calibration technique makes possible a new, and more practical, architecture for Solar Power Satellites. Most previous solar power satellite concepts involve the construction of unified multi-kilometer sized structures. With this invention, rather than a large unified structure, the invention may employ a collection of small free flying satellites distributed over a volume several kilometers in diameter. The invention shows how to coherently phase conjugate a microwave signal transmitted from the ground up to the constellation of satellites so that the amplified return transmission is concentrated in a desired way within a highly restricted area on the ground. The invention solves the problem of achieving the required phase precision in the return microwave beam. The invention also provides a new way to more uniformly distribute the microwave beam over a large ground based rectenna.

10 Claims, 13 Drawing Sheets

(56) References Cited

OTHER PUBLICATIONS

Physicsworld, Clery, Daniel, "Space-based solar power is getting serious . . . ," Science, vol. 378, Issue 6617. PhysicsWorld, Oct. 2022.

"URSI white Paper on Solar Power Satellite Systems . . . ," URSI Inter-commission Working Group on SPS, Jun. 2007.

McLinko, et al, "Space-based solar power generation . .. ," DSpace@MIT, International Conference on Space Information Technology 2009, SPIE.

Barde, Henri, "A Skeptic's Take on Beaming Power to Earth From Space", IEEE Spectrum, May 9, 2024.

Brown, W.C., "Rectenna Technology Program," Raytheon, 1987, NASA-CR-17955d, Contract NAS3-22764.

Fusco, et al., "Developments in retrodirective array technology," IET Microwave, Antennas & Propagation, vol. 7. Issue 2, p. 131-140, Jan. 2013.

Kokel, S. J., "Retrodirective phase-lock loop controlled phased array antenna for a solar power satellite system," Master of Science Thesis, Texas A&M University, Dec. 2004.

Winternitz, Luke, "Introduction to GPS and other Global Navigation Satellite Systems," NASA/Goddard Space Flight Center, 42nd Annual Time and Frequency Metrology Seminar, Jun. 2017, Chart 25.

IEEE 1588-2019, IEEE Standard for a Precision Clock Synchronization Protocol for Networked Measurement and Control Systems, https://ieeexplore.ieee.org/document/9120376.

\* cited by examiner

METHOD AND SYSTEM FOR CALIBRATING ANTENNAS WITH APPLICATION TO SOLAR POWER SATELLITES

CROSS REFERENCE TO RELATED APPLICATION

This application claims the benefit of U.S. Provisional Patent Application No. 63/697,946, filed Sep. 23, 2024, which application is incorporated in its entirety here by this reference.

FIELD OF THE INVENTION

The present invention pertains to synchronizing the phases of remotely located antennas or antenna segments. It introduces a periodic time reference to assist in adjusting the various phases. The present invention also relates to Clock Synchronization. The invention offers a two order of magnitude improvement in synchronizing remote clocks. The present invention also applies to Solar Power Satellite Architectures. It offers a novel disarticulated architecture.

BACKGROUND

Peter Glaser patented the modem idea of a Solar Power Satellite (SPS) in 1973. Since that time most studies of the subject have adopted his idea of a very large unified structure in geosynchronous orbit beaming microwave power to a large receiving antenna, called a "rectenna," on the Earth. A rectenna is an antenna with a rectifier attached to each antenna element so that the element, and the antenna as a whole, delivers direct current at some summed voltage level.

The structure of these conventional proposed solar power satellites comprises two basic elements: a device for collecting solar energy and a microwave transmitter which sends the collected power to the ground. As previously proposed, both these elements are physically very large. The solar energy collection device is usually proposed to span several square kilometers in area. The microwave transmitter must likewise have a very large antenna array so as to be able to focus the microwave energy on the ground based rectenna.

The governing issue for power transmission is the very long distance from geosynchronous orbit to a mid-latitude location on the Earth. The distance works out to be about 37,500 kilometers. Because of this long distance, in order to constrain the illumination on the ground the diameter of the power projecting antenna must be very large. Conventional unified concepts have a power antenna diameter of about one kilometer.

There is a major structural issue regarding such a large antenna of conventional structurally unified architectures: the antenna must maintain phase coherence equivalent to about one centimeter over its entire kilometer wide surface. This, despite ever changing sun angles, rotation loads and other mechanical stressors. It is very difficult to create a light weight structure which is one centimeter flat over a kilometer extent under these environmental conditions.

The gigantic size of the various proposed power satellites introduces a number of challenging questions:

How are they to be constructed and maintained?
How will the structures be articulated and maneuvered for its major elements to simultaneously follow the sun and a location on the Earth? Large unified structures introduce an almost insuperable problem in being able to differentially rotate a solar collector and an antenna. These disparate elements need to track the continuously changing relative directions of the sun and Earth as the structure traverses its orbit. This suggests that the needed articulation between the solar receptor and the antenna array may be very difficult to achieve with a unified structure.
How is phase calibration to be maintained in a very large antenna? How will structural flexing be compensated given the required antenna structure is very large and pliable?
How efficient can the system be in converting solar energy to electric power on the ground?
How is heating to be managed? Thermal radiators are needed to eject the substantial heat load out to dark space.
How can the system be cost competitive with ground based power generation?
Are there major safety concerns and how are they to be resolved?

Despite the wide variety of technical proposals, no good solution has heretofore been proposed. Here, a combination of related inventions offers a fundamentally new way of answering the foregoing questions.

An alternative to a giant unified solar power satellite structure is a swarm of small, free flying, power satellites. Such a constellation would require a novel method of coordinating, and phasing, the power transmissions from these small power units so as to form a single coherent power beam. Means must therefore be provided to synthesize a single antenna from the various local antennas of the multitude of power units.

One solution is to use the antenna calibration invention disclosed here. This new calibration technique uses the novel combination of a remote sourced pilot phase and timing signals sent from the rectenna to amplify, and phase conjugate, the power return. This is discussed in detail below. The distributed constellation antenna eliminates the structural problem of conventional very large unified antennas.

PRIOR ART

There are three fields related to the invention: 1) antenna calibration, 2) clock synchronization, and 3) disarticulated Solar Power Satellite (SPS) architectures.

1) Antenna Calibration Prior Art: A new method of calibrating the power transmission antenna is the key invention in a new Solar Power Satellite Architecture.

This disclosure offers an antenna which is disarticulated. Its segments may be spaced up to kilometers apart. This means that conventional antenna calibration techniques are not useful for calibrating the antenna disclosed here.

Only for radio astronomy is a disarticulated antenna in common use. The segments of a radio astronomy antenna are also spaced a substantial distance apart (the segments may be on different continents).

Perhaps the greatest distinction between the two antenna types is that the antenna disclosed here transmits power to a receiver whereas the astronomy antenna receives a signal from a distant power source. The distinction is crucial. The disclosed invention power antenna operates in real time, whereas the astronomy antenna compiles and correlates its received signals some substantial time after the signals were received. Therefore, the method for calibrating the power transmission antenna of the invention is fundamentally different from the method for calibrating a radio astronomy antenna.

2) Clock Synchronization Prior Art: A key element in this invention is a requirement to precisely measure the distance between the master control unit and each power unit. This distance measurement involves the transmission of a signal from the master control unit to a given power unit. The power unit retransmits this signal back to the control unit and the round-trip time determines the distance between them. This range information is then used to synchronize a clock on each power unit to the clock on the master control unit.

This round-trip range time determination is also one of the techniques used to synchronize the clocks on the GPS and other navigation satellites. Thus, in principle the technique is not new. The IEEE 1588 Protocol provides one example of such a synchronization standard. What is introduced here is similar. However, its application to the new architecture is quantitatively, and therefore qualitatively different.

There are two orders of magnitude difference between the timing accuracy of the GPS system and the new invention. The GPS clocks are synchronized to an accuracy of $3.3 \times 10^{-9}$ seconds. This gives a GPS satellite position error of about one meter. The interval between these position measurements is about twelve hours. This positional error is too large for the proposed solar power satellite constellation which needs centimeter accuracy measurements every few seconds.

This invention requires the transmitted power wave from a collection of antenna segments to be phase coherent at the receiver. Phase coherence means that the phase error in the signals received from the different antenna segments should not be significantly more than one quarter of a wavelength. Thus the need to improve the time accuracy by two orders of magnitude.

The invention's need for mutual phase coherence is in contrast to the GPS system which does not require phase coherence. Unlike this invention, GPS does not transmit a phase coherent signal, it transmits time measurement information. The required GPS time measurement accuracy is equivalent to about a one meter relative delay in receiving signals from the various GPS sources.

Measurement accuracy for the proposed segmented power transmission antenna must be a small fraction of a microwave wavelength. The preferred system described herein involves a twelve centimeter signal wavelength. For phase coherence, distance measurement accuracies must be on the order of a centimeter instead of the one meter GPS positioning accuracy. This means that the clock on the power unit should maintain synchronization to the clock on the master control unit to on the order of $10^{-10}$ to $10^{-11}$ seconds over the time interval between periodic resynchronizations. This is two orders of magnitude more stringent than is required for GPS. Furthermore, because of constellation motions, the time interval between resynchronization must be as short as possible within the constraint that each unit in the constellation must be separately addressed. New range measurements, and clock synchronizations, must happen every few seconds.

The required synchronization accuracy can be achieved with sub-resolution correlation techniques as described below in the Appendix.

3) Relevant Architecture Prior Art: As noted, giant integrated SPS structures are problematic. A fundamentally different architecture disaggregates the components of such a structure into an ensemble of free flying small SPS power producing units. Various such schemes of this sort have been proposed. With one exception, these are irrelevant. The only significant prior art was patented by a group at the Mitsubishi Corporation.

The Mitsubishi SPS architecture is illustrated by FIG. 13. It comprises a constellation of power unit satellites 1301 controlled by a master control satellite 1302. The power units transmit microwave power signals 1311 to a rectenna 1306 on the ground. A microwave beacon transmitter 1310 sends a signal to the control satellite 1302 which defines the direction from the satellite group back to the rectenna. The phase of emission from each power unit is adjusted to be equivalent to radiation from a common virtual plane 1303. It is noteworthy that this virtual plane has an arbitrary orientation. Mitsubishi's virtual plane synthetic antenna is very different from the virtual synthetic antenna introduced as part of this invention which is a spherical time reference surface.

In principle, the Mitsubishi architecture can be made to work. However, it is constrained by the fact that the master control satellite 1302 does all the hard work of controlling the phase of each of the power unit satellites 1301. Thus, as the number of power units increases so too must the complexity of the master control satellite in proportion. This increasing burden of complexity creates a practical limit as to the number of power unit satellites that can be serviced and therefore the amount of power that the constellation can deliver down to the Earth. A solution that does not scale in complexity is needed. The invention architecture, described below, provides this scalable solution.

All the segments of the Mitsubishi concept are analogous to corresponding segments of the invention architecture. What is different is the way these segments function in the two competing architectures. The Mitsubishi architecture operates with open loop phase control of the power beams. All of this control is exercised by the master control satellite.

The invention architecture uses closed loop phase control. In the new invention the phase control is done locally, at each of the power units, instead of being the responsibility of the master control satellite. Thus the invention can be scaled to arbitrary size without significantly increasing the complexity of the master control satellite. In the new invention the job of the master control satellite is only to establish a time standard for the constellation as a whole. This is much easier to do than to directly control the radiating phase of each power unit.

The invention solves the phase control problem by synchronizing clocks on each of the power units, and by introducing a time reference surface. These new features eliminate the complexity of the master control satellite. The time reference surface superficially appears to be the analog of the virtual plane 1303. However, the time reference surface functions differently. And, it does not have an arbitrary orientation. The time reference surface is automatically constrained to be perpendicular to a special signal transmitted from the rectenna.

SUMMARY OF THE INVENTION

This invention introduces a novel way of calibrating a very large microwave antenna. The invention is useful for the microwave transmission of large amounts of energy. It has application to orbiting satellites which collect energy from the sun and transmit that energy to the ground. Such satellites are conventionally known as Solar Power Satellites (SPS).

The antenna of interest is composed of segments which can be kilometers apart. One key element, and significant novelty, of the invention is the incorporation of a clock on each segment which is synchronized with a master clock in a centralized control unit. These clocks are used to determine the geometry of the antenna and, once the geometry is determined, the clocks enable the various antenna segments to be brought into phase coherence so that the ensemble of segments acts as a single antenna.

The invention uses the segment clocks to determine the temporal structure of the collection of antenna segments by employing a periodic time reference signal from a remote calibration source. In so doing it also defines a portion of the spatial structure.

An antenna is normally considered to be a spatial structure. This invention conceives of the antenna system's structure as temporal in nature. What this means is that, instead of the antenna segments being spatially connected, they are now connected in time or phase. All antenna segments are primarily located in time relative to a common time reference surface regardless of where they are physically in space. A time reference surface is a locus of identical phase in a propagating wavefront.

This time coherence is achieved by periodically transmitting time reference signals from a distant calibration source. The arrival times of signals at each antenna element (the master control and the antenna segments) are measured by the local synchronized clocks. The offset of these times from the time reference surface determines the temporal distance of each segment from the time reference surface, and therefore its relative phase. Once determined, the relative phase can be brought into coherence with the phase of the time reference surface by a (modulo wavelength) phase adjustment. It is in this sense that the system is a temporally organized structure, rather than the usual spatially defined structure.

In an example solar power system the time measurement signal comprises a periodic series of time marks sent up to the SPS from a rectenna—i.e. a rectifying antenna—on the ground. The invention's novel introduction of the periodic time marking signal makes it possible to precisely determine the location of each orbiting antenna element with respect to a novel time reference surface. It is this temporal position determination that enables the synthesis of a phased array antenna from widely dispersed antenna elements.

This antenna calibration invention allows a variety of new solar power satellite architectures. One of these comprises a plurality of widely spaced independently orbiting satellites, called here power units, each of moderate size. The invention makes this novel architecture possible by providing a new means of adjusting the transmitter phase of each of these satellites so that they collectively create a single phased array antenna.

Each of the modest sized power unit satellites coherently transmits its power directly to the rectenna on the ground. A pilot signal accompanies a timing signal transmitted from the rectenna up to the SPS so as to provide a phase reference. By utilizing phase conjugation of the pilot signal the return power beam is directed back to the rectenna.

Phase Conjugation (also known as Time Reversal) of a microwave pilot beam is now understood to be particularly useful for solar power satellites. Phase conjugation depends on the solar power satellite receiving a phase reference pilot signal transmitted from the receiving antenna on the ground. The process of phase conjugation creates a reverse wave which exactly replicates the propagation of the received pilot wave, but in the opposite direction, so that the return power beam is focused on the receiving antenna. This invention achieves phase conjugation without the need for a structurally unified antenna.

DESCRIPTION OF THE INVENTION

Figure 1:
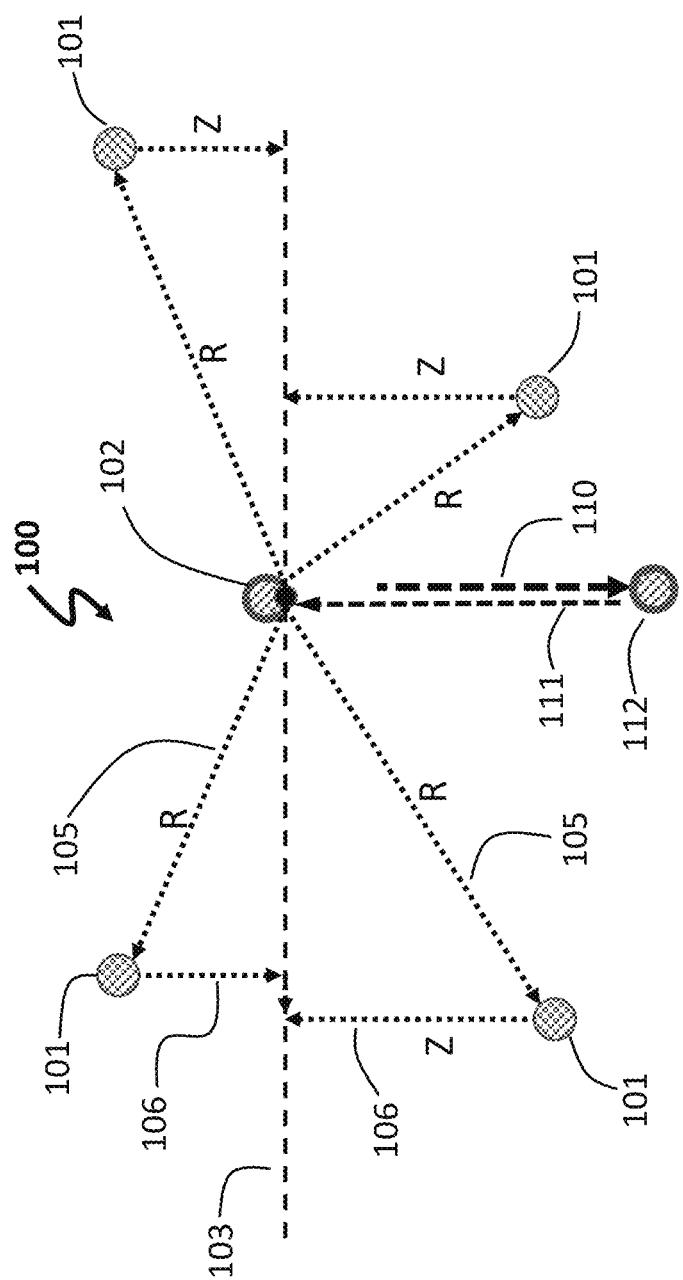
FIG. 1 is the geometry of a constellation of power units with respect to the time reference surface.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Overview: The primary invention disclosed here uses time difference measurements to precisely define the temporal structure of a very large antenna. It employs novel apparatus and means to calibrate the antenna. It can organize a collection of co-dependent transmitters so that they can collectively deliver a concentrated microwave signal to a remote location. The antenna calibration invention becomes a key enabler of Solar Power Satellites (SPS), especially a novel disaggregated type of SPS architecture introduced here.

The disclosure begins by presenting this new means of calibrating an extended antenna. It should be noted that the new antenna calibration technique is general and it may be used for a variety of systems. The exposition of the new antenna calibration invention is followed by a detailed description of its application to an example SPS architecture.

THE FUNDAMENTAL PROBLEM: The key problem that this invention solves is how to efficiently, and safely, deliver power to a remote location from a randomly positioned collection of radio transmitting antennas. Disclosed below, in association with FIGS. 1 through 5, is a new method of dynamic antenna calibration.

DEFINITIONS: A segmented antenna system is comprised of these components: An Antenna Element comprising a Master Control Unit, which organizes multiple Antenna Segments within the antenna element in time and space, a Distant Calibration Source which provides phase and timing information for phase calibrating the antenna element, and a Receiving Antenna which intercepts radio signals sent from the antenna element.

Signals are exchanged between, and among, these components. In preferred applications these signals are communicated by means of microwave radio.

There are two types of signal communications and apparatus. The first of these, defined as a "first type," employs a first type communication apparatus, or first type communicator, configured only for selective communication between the master control unit and, individually, with each of many generally separated antenna segments of the antenna element.

Disclosed here is a preferred system where the antenna element comprises physically separated and free flying antenna segments plus the master control unit. For this application the first type of communication is preferably microwave radio.

The master control unit, and each antenna segment of the antenna element, has a clock and digital sampler. In normal operation these clocks and samplers are mutually synchronized. This synchronization is a key requirement for the operation of the antenna system.

Each antenna segment of the antenna element is a physically unified structure which is comprised of a multitude of radiating elements. Each of these radiating elements is embodied, in preferred form in the description of FIG. 4 below, as a Transmit/Receive module—or TR module. In combination these radiating elements receive signals from the distant calibration source and radiate back a signal to a distant receiving antenna. All these radiating elements are mutually coherent.

Communication within an antenna segment, or within any very large scale antenna, is also first type. However, because it takes place within a single physically unified structure, the communication can be via physical connections such as electrical wiring or fiber optics.

A second type of communication from a second type communication apparatus, or second type communicator, connects the antenna element, with the distant calibration source and with a receiving antenna. The receiving antenna is preferably co-located with the distant calibration source but does not have to be.

Second type communication preferably uses radio communication, and therefore, can be a radio apparatus. In descriptions below, the term "second type," unless otherwise specified, will subsequently refer to forward radio communications between the distant calibration source and the segmented antenna element on the one hand, and a return signal to the receiving antenna on the other. Generally, this second type communication, from the distant calibration source and to a distant receiving antenna, will be at microwave frequencies.

The second type signal communication and apparatus provides phase and timing microwave communication transmitted by a distant calibration source to the segmented antenna element. This phase and timing signal is received by the segmented antenna element and then returns a second type signal to a receiving antenna.

For an application to solar power transmission the distant calibration source and a power receiving antenna will be co-located on the ground, whereas the segmented antenna element will preferably be located in geosynchronous orbit.

Both first type and second type communications combine to enable temporal and spatial delineation of the system. Through time delay measurements the distance of each antenna segment, from the master control unit, and from a Time Reference Surface, is determined. These distances are used to discover the segment's phase distance from the time reference surface. Preferably, each antenna segment should be oriented parallel to the nearest part of the time reference surface. In preferred applications the time reference surface will be the surface of a sphere centered on the distant calibration source.

Antenna Geometry:

Referring to FIG. 1: The figure illustrates the essential geometrical elements of an antenna system architecture 100. In the preferred embodiment the antenna system is an active radio phased array antenna comprised of multiple antenna segments 101. Each of these segments is, in turn, a phased array antenna comprised of a multitude of Transmit/Receive (TR) modules. The totality of TR modules, mounted on the various antenna segments, is distributed throughout a volume of space.

In addition to the antenna segments there are two additional elements. A master control unit 102 coordinates the activity of the antenna segments through first type signal communication. In addition, there is a distant calibration source 112 which provides second type radio phase and timing signals to position and phase calibrate the segmented antenna system.

Timing and phase control are two separate functions that propagate together as second type radio waves emitted from the distant calibration source 112. The time marking signal creates a set of periodic time marks which are used to synchronize the clocks and digital samplers on the various antenna segments 101 with a master clock and sampler on the master control unit 102. A pilot wave, which is also part of the distant calibration source 112, accompanies the time marking signal. This pilot wave serves to provide a phase reference for phase conjugation.

The temporal position, with respect to a time reference surface 103, of each TR module, within the antenna system as a whole, must be known to a fraction of a wavelength. The introduction of a time reference surface is a novel contribution of this invention.

The time marking signal 111 is a second type microwave radio broadcast from a single point antenna. This produces a spreading continuously transmitted spherical wave. This wave defines a geometric time reference surface where it touches the master control unit. This surface is a sphere centered on the calibration source 112. Where the time mark signal touches the master control unit the sphere approximates a plane which is perpendicular to the light of sight vector between the master control and the distant calibration source.

Reversing the outgoing time marking wave generates an incoming wave 110 which converges on the distant calibration source. Thus, radiation from the time reference surface will be focused on the distant calibration source. For an SPS system this would focus energy on a receiving rectenna that is collocated with the calibration source.

Thus the phase of each antenna segment should be referenced with respect to the time reference surface. The result of this phase adjustment will be to synthesize, from the collection of antenna segments, a phased array antenna which is conformal with the spherical time reference surface. This virtual antenna focuses its return beam on the time mark transmitter of the distant calibration source.

Description Details: Referring again to FIG. 1, a second type radio communicating antenna segment has a separate antenna for first type selective communication with a master control unit 102. Preferably, this first type communication will be a microwave radio. In FIG. 1 a master control unit 102 provides a time and space reference for the constellation. The master control unit has both first type and second type radio antennas for communication. This control unit is in selective first type communication with each antenna segment 101, and is in second type radio communication with the distant calibration source.

It is essential that the clocks of all antenna segments are synchronized to the clock on the control unit 102. The purpose of this synchronization is to provide a universal time framework for making the Z-range 106 time delay measurements to the time reference surface. This synchronization requires determination of the R-range 105 time delay between the master control and the individual antenna segment 101. This time delay measurement of the R-range, and the consequent clock synchronization, is made by exchanging signals, through first type communication, as is described below in association with FIG. 3.

The distant calibration source 112 transmits two distinctly different types of second type microwave signals 111: a time marking signal 111 is used to help determine the temporal locations of the individual antenna segments with respect to the time reference surface 103. In addition, the calibration source includes a co-propagating phase reference pilot signal, also designated 111, which provides a phase reference for the various antenna segments.

To establish the preferred SPS constellation geometry the time marking signal 111 is transmitted from a single transmitter. This timing signal accompanies the phase calibration pilot signal from other transmitters. This time marking signal must be distinguished from the pilot and power waves. In a preferred embodiment the time marking signal is on its own frequency. Alternatively, it could be a modulation on the pilot wave.

A generally spherical time reference surface 103 is established to be perpendicular to the direction of this timing signal 111 at the location of the master control unit 102. The control unit 102 informs all antenna segments 101 when it receives the most recent time marking signal. This establishes the temporal location of the time reference surface.

There is a propagation time difference between the time when the control unit receives a time signal 111 from the distant calibration source and the same time signal is received by a given TR module on an antenna segment 101. This reception time difference is used to compute the Z-range time and phase distance 106 of the TR module perpendicular to the time reference surface for that TR module.

When the control unit 102 receives each new time marking signal it first type broadcasts its reception time to all the antenna segments in the constellation. Each antenna segment then compares the time when it receives the time marking signal with the control unit's time of reception. This time difference defines the Z-range time, or phase, difference distance 106 perpendicular to the nearest part of the time reference surface 103.

This Z-range distance must be known to within a fraction of a wavelength (modulo wavelength). The same is true for the R-range time difference distance 105 between a TR module of a given antenna segment and the control unit. With the accurate knowledge of these time differences, it is possible to determine the phase of the incoming wave at each different antenna segment, and each TR module within the antenna segment, relative to that of the time reference surface 103. And also, from this phase delay, the needed phase shift for phase conjugation can be determined as described in association with FIG. 2.

In effect, through this phase correction, each TR module has virtually shifted its phase relationship to be in-phase at the time reference surface. The time reference surface then acts as a virtual spherical phased array antenna focusing its outgoing signal on the distant calibration source after the desired conjugation phase adjustment.

Solar Power Satellites: One important application of this invention is calibrating the power antenna of a Solar Power Satellite (SPS). The sun's power collected by the SPS is typically proposed to be radio transmitted, at a microwave frequency, to a receiving antenna on the ground. The receiving antenna rectifies the received signal and turns it into a direct current. Such a rectifying receiving antenna is conventionally defined as a rectenna.

In a preferred solar power system, the segments of the antenna system are mounted on free flying independent solar power units. A power unit collects sunlight and delivers the resulting electrical energy to its attached antenna segment for radio transmission to the rectenna.

The solar power antenna system's transmission is governed by a distant pilot wave phase calibration source located at the rectenna. The preferred embodiment of this distant phase calibration source consists of one, or more, transmitters located within the confines of a rectenna. This will be described below in association with FIG. 11.

In order to efficiently microwave radio transmit the power of a SPS to the ground it is essential that the emissions from all parts of the power transmitting antenna have the same phase and polarization when they reach the receiving rectenna. To do this, phase coherence must be established and maintained over the antenna as a whole. This phase coherence is of such a nature that all the power waves transmitted by the various antenna segments are in phase at the receiving rectenna.

This can only be accomplished if the temporal position of each radiating element, (TR module) within each microwave antenna segment of the entire transmitting antenna system is known to a fraction of a wavelength! Temporal position is to be determined with respect to the time reference surface through time difference measurements. It is through this determination that phase adjustments, preferably through phase conjugation, can be made to direct a return signal to a distant rectenna.

As described above, the invention provides new means for very accurately determining, in real-time, the relative temporal positions of these antenna segments, and the individual transmitter/receiver (TR) elements within them. This is a necessary precondition for achieving the required system phase coherence. Once these temporal positions and phases are known it is possible to phase conjugate a pilot wave from a distant calibration source and send power in the reverse direction.

Phase Conjugation: This is a way of reflecting a pilot wave in such a way that it exactly retraces the pilot wave's path back to the original source. In so doing the reflected wave must have precisely the same spatial phase profile as the incoming wave but with propagation in the opposite direction. It achieves this through inverting the spatial phase profile of the incoming pilot wave (inversion means a local phase shift of 180°). As discussed below in association with FIG. 11, the pilot wave will be emitted from a phased array of transmitters located within the rectenna. The resulting pilot wavefront will have slight deviations from a true sphere. Phase conjugation corrects those deviations and acts to precisely project the return power wave into the confines of the rectenna.

Location Independence: One of the great benefits of this new method of antenna calibration is that it doesn't matter where the antenna segments and calibration source are located in space or on the ground. The calibration source and its associated rectenna can be at any latitude and longitude as long as it is visible from the SPS constellation. In turn, the SPS constellation can be in any orbit. The line of sight vector from the distant calibration source is always perpendicular to the time reference surface at the master control unit by the very nature of the calibration technique.

Because of this perpendicular relationship to a sphere, even without phase conjugation the power beam would automatically be focused to return to the vicinity of the calibration source and rectenna. Phase conjugation in this case has the benefit of phase contouring the power beam so that the rectenna can be smaller and the power transmission efficiency is almost 100%.

The simplest practical system orients each antenna segment so that it is parallel to the time reference surface. This may most easily be done through optical means, as will be discussed below.

The automatic antenna calibration technique, introduced here, provides a great advance over the antennas of previously proposed solar power systems. In those earlier systems a very large antenna may be tilted as much as eight degrees with respect to a rectenna on the ground. This means that the edge mis-alignment can be several tens of meters. To compensate for this large tilt, precision beam steering becomes essential with these earlier concepts. This preferred system does not require beam steering.

Periodic Recalibration: The spatial positions of the various antenna segments may vary with time and may be distributed over a large volume centered on the antenna system's orbital position. Means must be provided to accurately determine, in real time, their relative phase positions so as to achieve the desired phase relationships for phase conjugation of the pilot wave. For a typical SPS constellation in geosynchronous orbit the relative motions of the various antenna segments over a twenty four hour day requires that the constellation's synthesized antenna must be recalibrated every few seconds.

Antenna Calibration and Phase Conjugation:

Referring once again to FIG. 1, phase conjugation is a way of reflecting a received electromagnetic wave 111 so that the return wave 110 precisely traces the path back to the distant timing and pilot wave phase calibration sources 112. These sources, in a solar power satellite system, are preferably located within a rectenna. Everywhere along the wavefront there is a reversal of propagation direction: so $\exp(\omega t-kz)$ becomes $\exp(\omega t-k(-z))=\exp(\omega t+kz)$. In effect, phase conjugation is a way of precisely focusing the conjugate beam back onto the transmitter of the pilot wave.

The rectenna of a geosynchronous SPS system is in the Fresnel zone of the SPS antenna. It is necessary, therefore, to somehow deliver the return power beam 110 into the area of the rectenna on the ground. Phase conjugation automatically provides this delivery. The resulting propagation is deliberately defocused for safety reasons (see FIG. 11).

This invention provides a new way to achieve phase conjugation. It uses a two-step process. The first task is to synthesize an ideal phased array antenna. It does this by bringing the phase of each transmit/receive (TR) module in the system into phase alignment with a time reference surface. This is described above in association with FIG. 1. Once done, the second task is to detect the phase variations (relative to the time reference surface) along the incoming wavefront and apply the reverse of these phases to the transmitted (phase conjugated) return wave.

Figure 2:
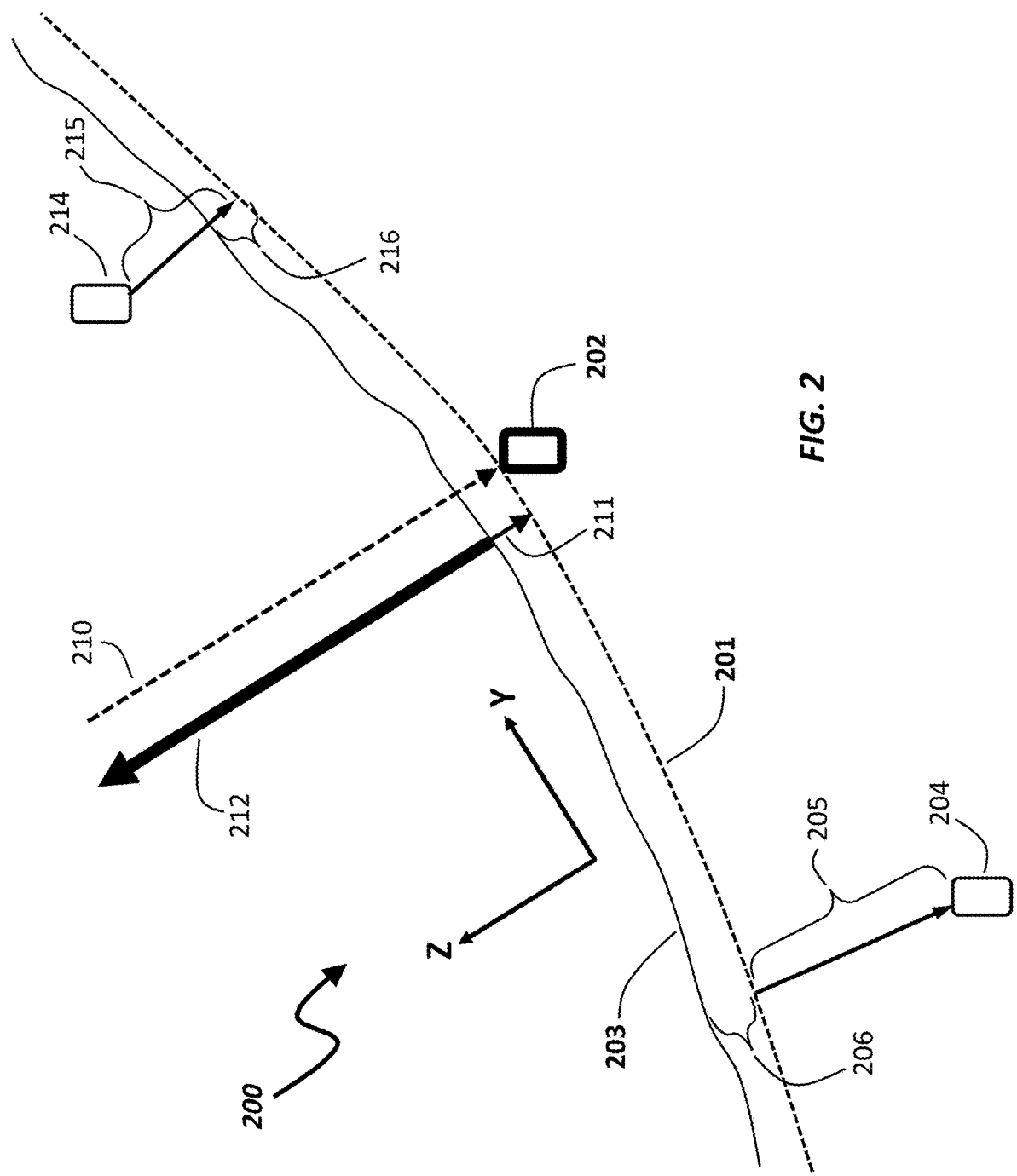
FIG. 2 is the antenna element and a representation of the phase change needed for phase conjugation a received microwave signal.

Referring to FIG. 2, the general scheme for phase conjugation at the antenna element 200 is illustrated. A time marking signal 210 is received from the distant calibration source which, for an SPS system, is located at the rectenna. The frequency of the time marking signal may be selected so that it can be readily distinguished. This time marking signal 210 establishes a time reference surface 201 when it arrives at a master control unit 202.

The time reference surface is a sphere centered on the distant calibration source's time marking signal transmitter. This surface provides a time reference for adjusting the phase of each TR module in each antenna segment so that the module appears, in a virtual sense, to be located on the time reference surface. When these phase adjustments have been made for all the TR modules, they act in total as a single phased array antenna conformal with the time reference surface.

The antenna element 200 of FIG. 2 provides two examples of TR modules. Module 204 lies a distance 205 behind the time reference surface 201. Module 214 lies a distance 215 in front of the time reference surface. These distances, 205 and 215, can be several kilometers in length. This means a phase delay, or advance, of up to thousands of wavelengths.

These distances are measured by recording the difference in the time when the master control unit receives a time marking signal 210 and a given TR module receives that same signal. This time difference measurement must have ten picosecond precision over a time interval of several microseconds. This establishes the dynamic range of the measurement process.

In order to bring a given TR module into phase coherence with the time reference surface it is necessary to strip off most of the phase length corresponding to distances 205 and 215. This is done through modulo wavelength computation. In modulo wavelength computation the total number wavelengths making up this time difference is calculated. The largest whole number of this calculation is subtracted off. This leaves fractional phase angles such as $\theta_{205}$ and $\theta_{215}$. It is then only necessary to adjust the clocks, or shift phase, by these residual angles to bring the TR modules into phase with the time reference surface.

Because module 204 is behind the time reference surface the time marking signal takes longer to reach the module so its marking time is greater than the time at the master control unit. Thus, the fractional phase angle $\theta_{205}$ must be subtracted from the phase of TR module 204.

Conversely, because TR module 214 is ahead of the time reference surface its fractional phase angle $\theta_{215}$ must be added to the phase of the TR module. These fractional phase adjustments make the TR modules appear, in a virtual way, as if they are located on the time reference surface 201. When these fractional adjustments have been made for each TR module in the system we will have constructed a phase array antenna conformal with the time reference surface.

Thus the time marking signal 210 serves to calibrate the antenna by helping adjust the phase of each TR module so that it (virtually) lies on the time reference surface.

A different task is carried out by the associated pilot wave 211. The pilot wave helps guide the return power wave 212 into a more uniform illumination of an associated rectenna.

Figure 11:
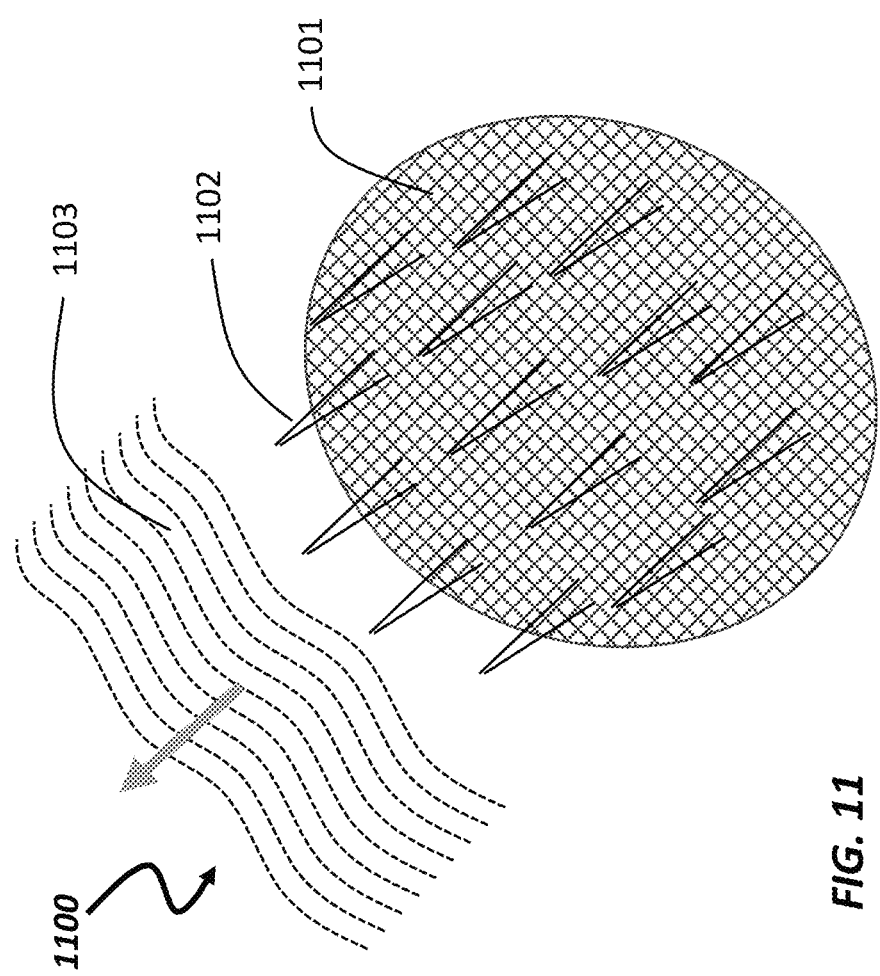
FIG. 11 is a representation of multiple, mutually coherent pilot wave transmitters located within the confines of a rectenna.

As illustrated by FIG. 11, a pilot phase reference wave 1103 is created by a preferred array of mutually coherent transmitters 1102. These are located within the confines of a rectenna 1101. Referring again to FIG. 2, in combination these transmitters send a phase reference pilot wave 211 which produces, a wave phase surface 203. Because this pilot wave is preferably generated by multiple transmitters, its phase surface 203 will, when it arrives in coincidence with the time reference surface, have slight phase error ripples. Phase conjugation automatically compensates for these ripples.

Using phase conjugation to create a return power wave 212 these transmitters within the rectenna act as an array of virtual "magnets" to attract the return power wave selectively back to these transmitters. This diffraction process more uniformly spreads the return power illumination over the interior of the rectenna and confines most of the energy to stay within the boundaries of the rectenna.

At TR module 204 the phase error 206 is due to the ripple has a phase angle $\varphi_{206}$. Similarly, there may be a ripple error 216 for TR module 214 with a phase angle $\varphi_{216}$. Each TR module must be configured to detect its local ripple phase error and reverse its sign thereby using this new phase to generate the return power signal 212.

To detect the ripple phase error each TR module must compare its time of arrival of the pilot wave with the time of the time reference surface. The resulting time difference gives the phase difference that must be reversed for phase conjugation This process will be discussed in association with FIGS. 3 and 4. below.

Antenna Calibration Task Flow:

The most plausible, and therefore preferred, power transmission antenna is an active phased array, although other antennas and transmitters are possible.

In an active phased array the power emitted by each individual transmitter element of the array is small and each may be solid state. Heat is generated locally and so may be radiated away locally. Thus, as a preferred embodiment, we consider in detail an antenna comprising an ensemble of transmit/receive (TR) modules, examples of which are discussed in association with FIG. 4. below.

In the following discussion, R-range and Z-range are defined in association with FIG. 1. They represent time delays in the propagation of signals between elements of the antenna system.

As discussed above, establishing a phase conjugated power transmission, from a constellation of antenna segments to a distant rectenna, requires a scheme for mutually phase calibrating the antennas of these various antenna segments. The calibration requires determining the relative phase of an antenna segment with respect to a central control unit and a time reference surface. This phase can be determined once the instantaneous relative time position of the antenna segment in the constellation is known.

Figure 3:
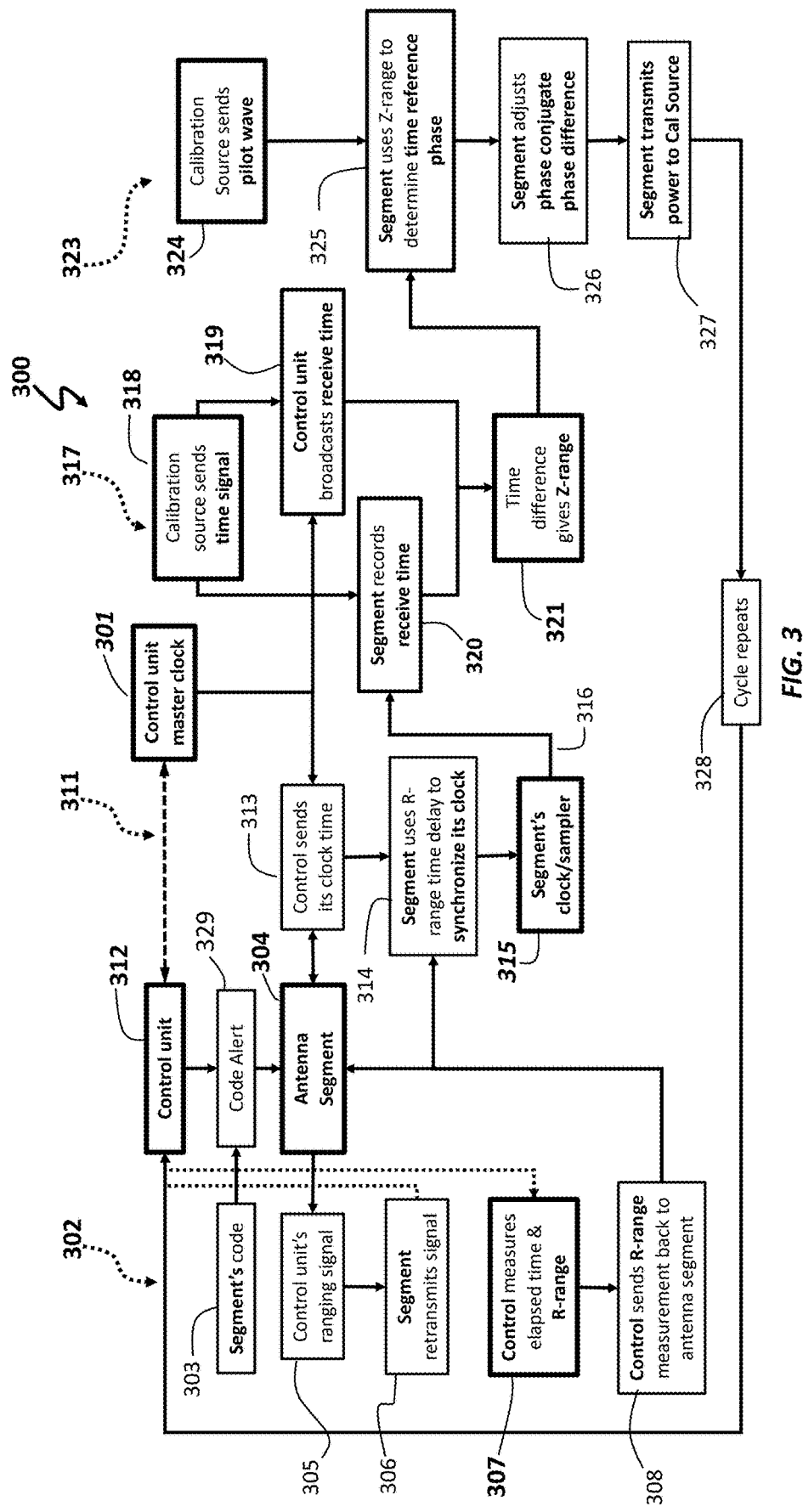
FIG. 3 is a block diagram of the signal flow needed to accurately determine the relative geometry of the satellite constellation and the positions of each of the power units within the constellation.

One example of how this can be achieved is illustrated by FIG. 3. This is a description of a four step process 300:

1. The time delay R-range 302 between the control unit and each antenna segment must first be determined.
2. Clock Synchronization 311 is next. With a known R-range time delay the antenna segment's clock 315 can be synchronized 311 with the master clock 301 on the control unit.
3. Then the Z-range and time difference 317 (106 of FIG. 1) from the antenna segment to the time reference surface 103 is determined by measuring the arrival time difference between when the control unit received a time marking signal 319 and the time 320 the antenna segment received that same signal sent by second type radio, preferably microwave, from the distant calibration source 318. This time difference 321 gives the Z-range time delay distance between the antenna segment and time reference surface.
4. Phase conjugation 323 uses the Z-range time delay distance to compute the phase 325 difference corresponding to the Z-range time delay distance. The phase measurement then is used to adjust the phase 326 of the phase conjugated power transmission 327 from the antenna segment.

Signal Flow: A combination of signals is needed to properly phase conjugate the high power transmission from the constellation back to the ground rectenna. Phase coordination comes, in part, from the second type microwave pilot wave 324 and timing signals 318 which are received from a distant calibration source. The two signals may have different frequencies so that they can be distinguished. In a solar power satellite system these second type radio signals preferably originate within the confines of a ground based rectenna. The constellation uses these signals to coordinate the phase of the microwave radio power transmission from each of the solar power unit satellites.

Each antenna segment has a precision clock and digital sampler 315. The segment's clock and digital sampler must be synchronized with the standard clock time and sample time of a master clock 301, on the master control unit 312.

Clock synchronization employs a unique first type signals exchange between the master control and a given antenna segment. Preferably this first type is microwave radio. This exchange of signals provides a range dependent time delay which tells how the antenna segment's clock must be adjusted to bring it into synchrony with the master clock. The uniqueness of this signal exchange can achieved, either by assigning a unique signal frequency for first type communication with a particular antenna segment, or by employing a uniquely coded modulation 303 to the signal.

Digitization and Sampling: The clock 315 on each antenna segment has two functions. The obvious one is to provide a time measure which is identical to the master clock. The second function is to control the digitization sampling of the second type radio time marking signal sent from a calibration source usually located at the rectenna. The time of arrival of the time marking signal is determined by correlating the modulation of the marking signal with a prestored reference pattern. As described below in the Appendix, an interpolation algorithm determines the offset of the marking signal with respect to the digital sampler. For accurate measurement of the arrival times throughout the constellation it is essential that the digital samples also be synchronized throughout the constellation. Thus, sampling must take place everywhere at specific times determined by the synchronized clocks.

Measuring Time Delay Range 302: Referring to FIG. 3, clock synchronization 311 requires accurately knowing the time delay R-range (105 of FIG. 1) between the master clock 301 and the clock 315 on any given antenna segment. In order to know the various time delays with the desired accuracy a very wide band time difference measuring signal 305 must be periodically transmitted, by first type communication, from the master control unit 312 uniquely to each subsidiary antenna segment. Each antenna segment is identified by a unique code 303 or, alternately, a frequency. This allows the control unit to uniquely address a specific antenna segment one at a time for time difference measurement and clock synchronization. A specialized first type receiver-transmitter is needed at each antenna segment to capture this uniquely coded time difference signal. This specialized device is relatively simple and has only two functions: it synchronizes the standard clocks and it helps determine the time delay R-range 302 to the master module.

To measure the time difference R-range 302, the coded signal 303 for a particular antenna segment 304 is transmitted by the control unit 312. This activates 329 the antenna segment. Then the control unit sends a first type ranging signal 305 to the specific antenna segment. The antenna segment instantly returns 306 that signal back to the control unit. The control unit measures 307 the R-range time delay and transmits it 308 back from the control unit to the antenna segment for further use.

Global Clock Synchronization 311: With the time delay R-range distance accurately known it is now possible to synchronize 311 the clock 315 on an antenna segment with the master clock 301. Synchronization starts with the control unit 312 selecting an antenna segment's code 303 and then alerting 329 a particular antenna segment 304. The control master clock 301 then sends 313 its time and sampling information to the clock control 314 on the selected antenna segment. This antenna segment clock control receives the antenna segment's R-range relative time delay determination 308 from the control unit. With the range information the time delay offset from the master clock can be calculated and the local antenna segment's clock and sampler 315 can be synchronized by including a correction for transmission time delay.

If need be, the antenna segment can transmit back to the control unit the antenna segment's estimate of the time at the antenna segment for confirmation. If the antenna segment's estimated control time is different than the true control time the synchronization process can be repeated until the antenna segment's clock is in true synchronization.

Once the antenna segment's clock has been synchronized with the master control clock, the sampler used for correlation processing of the time marking signal is synchronized with the sampler in the master control unit.

Measuring Z: Again referring to FIG. 3, the time delay Z-range distance 317 from the local antenna segment to the time reference surface can be determined using a second type microwave radio time marking signal 318 transmitted from the same distant calibration source as the pilot wave. It is essential that the pilot wave 324 and timing signal 318 be collinear so that the time reference surface is perpendicular to both.

In the preferred architecture the time marking 318, and pilot wave 324, signals originate at the rectenna on the ground. The time of arrival of the time marking signal at the master control is first type broadcast 319 to all antenna segments. When an antenna segment receives the time marking signal 318 its arrival time, as reported 316 by the antenna segment's clock and sampler 315, is recorded 320. The time difference 321 between the 320 and 319 arrival times gives the Z-range time delay and phase difference between the antenna segment and the time reference surface.

Phase Conjugation: Once the Z-range time delay and phase difference is known the antenna segment uses the Z-range time delay to determine 325 the total phase difference between the antenna segment and the time reference surface. Using the Z-range measurement the segment adjusts it's clock, or alternatively the signal phase, a small amount to bring it into phase coherence with the time reference surface. The segment is then ready for phase conjugation.

The antenna segment measures the phase difference between the pilot wave and the time reference surface. It then inverts the phase sign to conjugate the phase 326. (For individual TR modules the phase differences correspond to 205, or 215, in FIG. 2.) The now properly phased power beam is transmitted 327 back to the distant calibration source.

Resynchronization: For a geosynchronous SPS constellation, as a result of orbital dynamics there will be slow changes in the relative positions of the antenna segments. There will also be some drift in the relative clock time. Given the need for the constellation geometry to be known with considerable precision it is necessary for the measurement cycle 328 to be repeated frequently.

Precision Requirement: A sample calculation gives a rough idea of the range measurement precision required. At a frequency of 2.45 Ghz the wavelength is approximately 12.2 centimeters. Ideally we would like to hold the antenna figure to a tenth of a wavelength. This would require one centimeter position knowledge. However, a quarter wave figure is probably good enough.

For the example architecture a quarter wavelength is 3 centimeters. This corresponds to a light propagation time of $10^{-10}$ seconds. Because phase conjugation involves a doubling of the phase error, in order to keep the phase error less than a quarter wave it is necessary to have the timing error be half of this, or 1.5 centimeters. This corresponds to a maximum timing error of $5 \times 10^{-11}$ seconds. Because there will always be some drift between synchronizations, the timing error requirement may be required to be on the order of $10^{-11}$ seconds. This is two orders of magnitude more stringent than the clock synchronization requirement (3.3× 10−9 seconds) for the GPS satellites.

Figure 4:
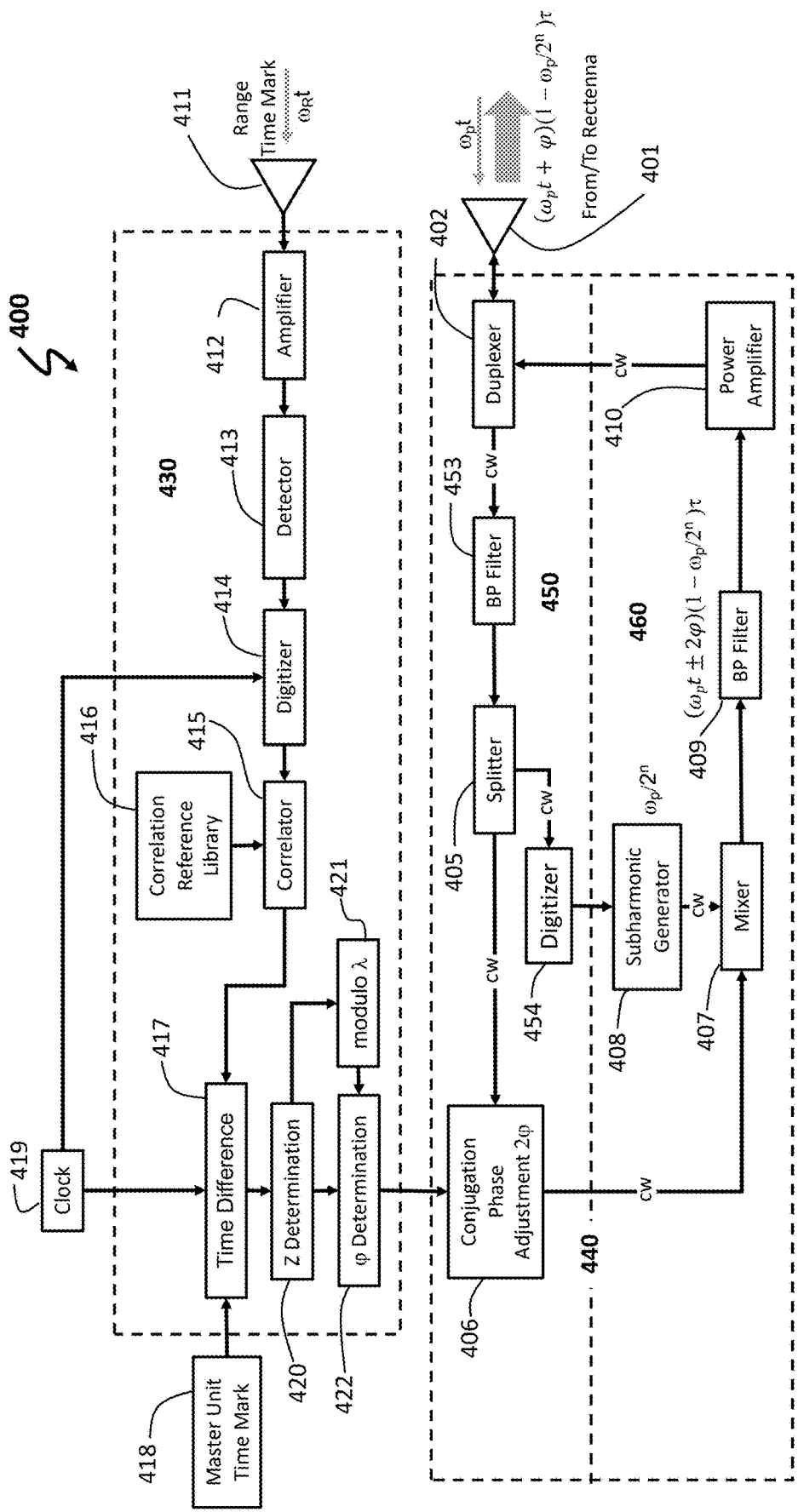
FIG. 4 is a block diagram of the signal processing within, and associated with, each transmit-receive TR module of the antenna of a power unit.
Figure 5:
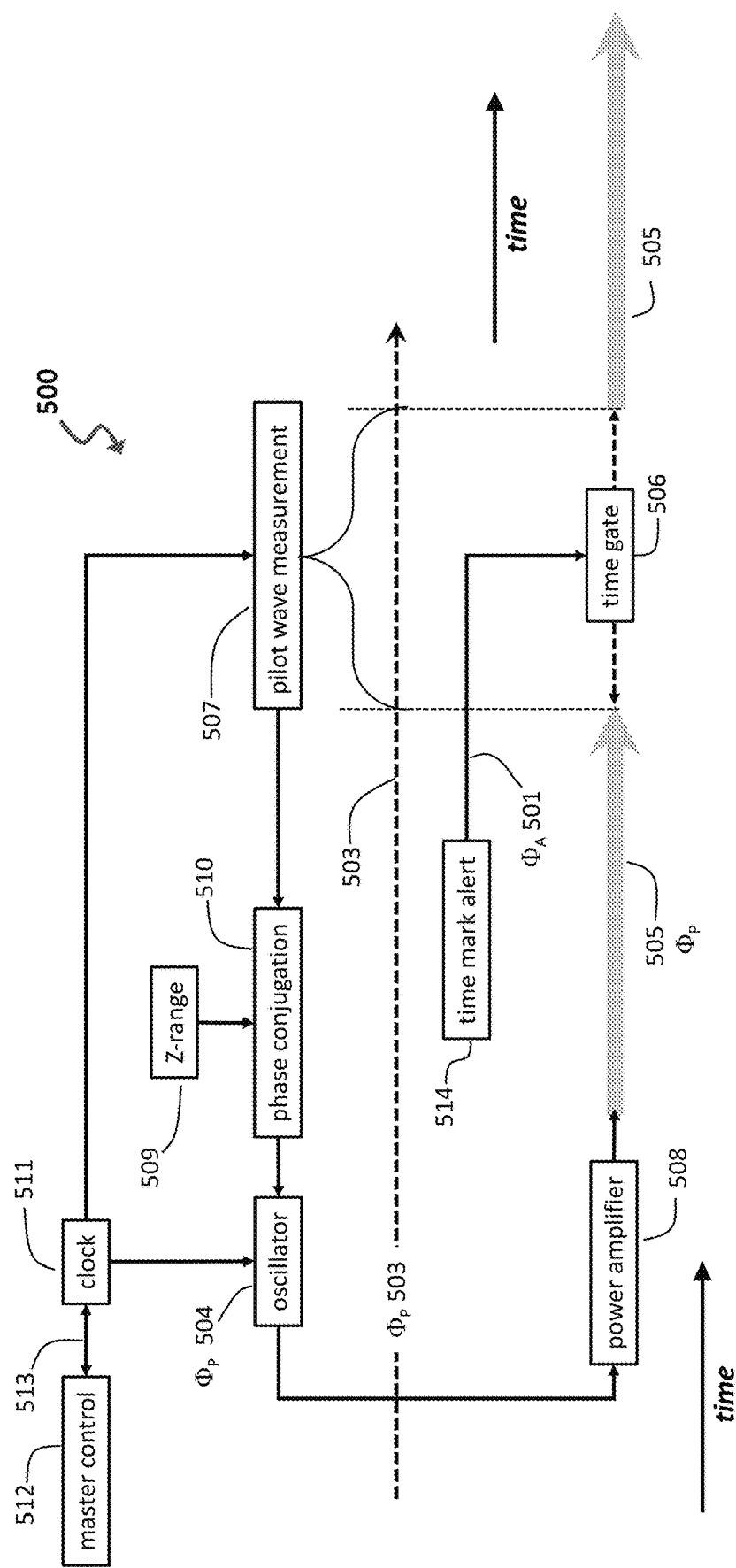
FIG. 5 illustrates interrupting the power transmission so that the pilot wave can be detected and measured.

Phase Conjugation Techniques:

FIGS. 4 and 5, show how phase conjugation might be achieved with a segmented antenna whose elements are widely separated and non-planar. These methods depend on measuring a periodic timing signal sent from a distant calibration source as well as determining the phase and polarization of a pilot wave signal received from that source. FIG. 4 examines a TR module within an antenna segment.

Calibration Signals:

At each power unit a second type microwave radio phase control pilot wave signal is received from one, or more, calibration source transmitters preferably located within the ground based rectenna (see FIG. 11). These signals provide a phase reference. A single time marking transmitter provides the periodic time reference needed to establish the constellation's geometry. For SPS application each power unit must convert the information in these two signals into a high power phase conjugated radio transmission. This done through cooperation of a timing signal receiver with processing within each TR module.

The Timing Receiver:

Referring to FIG. 4, illustrated are phase conjugation components 400 comprising both the Timing Receiver 430 and the TR module 440. There must be at least one timing receiver on each power unit. More likely, and preferred, each TR module would have its own time mark receiver, for local time synchronization, because this solves the problem of where the TR module is positioned on the antenna segment.

Local Time Synchronization: The antenna segment of a power unit will typically be several meters in diameter. It will contain thousands of TR modules spaced across these several meters. The time delay communicating from a single central synchronized clock to the furthermost TR module on the antenna can be tens of nanoseconds, whereas the synchronization error at each TR module must be very much less than a nanosecond. Thus, there is a requirement for local means to accurately transfer the power module's synchronized clock time to each separate TR module. This means there may be a requirement for range and timing coordination within the antenna segment. This coordination is a local, and miniature, replication of the coordination that takes place between the various antenna segments and the master control unit. The time delays from a central reference point on the power unit's antenna to each TR module in the antenna must be known. These time delays can be established when the power unit's antenna is fabricated at the factory.

As is the case for the constellation's global antenna calibration, the TR module's local calibration also depends on the distant time marking source. A TR module's total Z-range distance to the time reference surface is just the sum of the local z-range distance within the antenna segment for that module and the Z-range distance of the power unit within the constellation as a whole.

Timing Receiver and TR Module Collaboration: An example of how the timing receiver and the TR module might work together, is shown in figure FIG. 4. Each TR module receives the radio time marking signals transmitted up from the calibration source at the rectenna. Then, with that time marking signal, the TR module can calculate its z-range distance to the local time reference surface within the antenna segment. From there it can extend the calculation to the TR module to determine its global time Z-range distance to the constellation's time reference surface.

FIG. 4 shows a typical architecture for this Timing Receiver 430. The second type time marking radio signal is received from an antenna 411 and amplified 412. The amplified signal is passed through a detector 413 which strips off the modulation. The detected modulation signal is digitized 414 with sampling controlled by the clock 419. The sampling, and clock control, of the digitization process must be synchronized throughout the constellation for the phase measurements to be mutually coherent. This is done by using specific times from the constellation's master control clock (301 of FIG. 3) to determine when the samples are to be taken.

Time and Phase Determination: The digitized modulation of the time marking signal is passed to a correlator 415. The correlator matches the digital signal against a reference library 416 and the correlation very accurately computes when the time marking signal is received. As discussed above regarding correlation tracking, this time measurement is accurate to a small fraction of a digitized sample interval. The Appendix shows how this might be done.

This signal, incorporating the measured fractional sample offset, is delivered to a time difference measuring device 417. This device uses the output from the synchronized clock 419 to accurately determine the local time of reception of time marking signal. The time difference device 417 compares this locally received time from the distant calibration source with a first type time mark broadcast of the master timing signal from the master control unit 418. The difference in these two times is determined by the time difference device 417. This precision time difference comparison is used to compute the first approximation to the Z-range 420.

The Z-range time difference is used for a modulo wave phase error measurement. The modulo calculation, occurring in device 421, calculates the number of wave periods, including a fractional period, in the Z-range time difference and subtracts off the integer number of these periods. This leaves the fractional period which is used to determine a phase correction 422. This phase correction aligns the time receiver with the time reference surface.

Tr Receiver-Transmitter Signal Isolation:

The preferred Solar Power Satellite (SPS) concept involves a multitude of independent Power Units forming a constellation. Each power unit is equipped with a main second type microwave radio antenna for communication with a distant calibration source. The power unit's main antenna acts as one segment of an antenna system for the constellation of power units as a whole. This main antenna preferably is composed of an array of transmit/receive (TR) modules, each of which receives a second type pilot wave radio signal from a distant calibration source, inverts the phase of that signal, amplifies it, and transmits a much more powerful signal back to the vicinity of the calibration source. This is a process of phase conjugation with amplification.

For an SPS there are several orders of magnitude between the power of the signal received from the distant calibration source and the power wave transmitted, preferably through phase conjugation, in return.

It will require special multiplexing techniques to make this power wave conjugation possible. Accordingly, it is useful to examine in more detail possible methods for multiplexing and phase conjugating the weak pilot signal with the strong outgoing power signal. Two such methods are discussed below in association with FIGS. 4 and 5.

There are two elements governing the phase conjugation of the pilot wave signal. Each of the TR modules in the main antenna array of a power unit receives the weak pilot signal from the distant calibration source. In the case of an SPS system the preferred source is created within the confines of a rectenna. From this pilot signal it constructs a new return signal of great power and transmits this signal back to the rectenna. In a power unit's preferred antenna segment design there will typically be thousands of these TR modules forming a phased array antenna.

It is essential that there be isolation between the received weak signal pilot wave and the transmitted high power return wave. Without sufficient isolation, runaway positive feedback between the transmitter and receiver channels results and the TR module locks up.

Conceptionally there are two basic ways of achieving this isolation: two frequency multiplexing, and transmission interruption multiplexing. A method for achieving two frequency multiplexing is discussed in detail in association with FIG. 4.

Alternatively, the power transmissions could be periodically interrupted so that there is a quiet time for the detection of the frequency and phase information in the pilot wave. In this type of multiplexing both the pilot and power waves operate on the same frequency. One such scheme is illustrated by with FIG. 5.

Two Frequency Multiplexing:

In signal multiplexing, whatever type of antenna is chosen for the power unit, the receiver associated with the TR modules will likely be similar to the one illustrated by FIG. 4.

Frequency Differentiation: Many SPS concepts assume that a second type pilot wave signal from the rectenna is phase conjugated then amplified and sent back to the rectenna.

A fundamental problem occurs when an amplified retransmission of the pilot wave is at the same frequency as the incoming pilot wave. Any attempt to continuously receive the pilot signal while the power signal is being transmitted at the same frequency will result in positive feedback. And, this feedback will saturate the pilot wave receiver so that the power unit is only listening to itself. Thus, for an uninterrupted continuously wave (CW) transmitting system the only way to solve this problem is to have the power wave transmission at some frequency other than the pilot wave frequency. This is commonly known as frequency division full-duplexing.

Such a CW system, can be made to work if the frequency of the pilot wave signal is sufficiently different from that of the power wave. Then frequency rejection filtering of the power wave may be employed to prevent feedback from the power output channel to the signal receiving channel. As long as the offset frequency is relatively small the phase conjugated power beam will return entirely to the rectenna.

There are two possible frequency offset schemes of interest. The simplest involves frequency multiplication of the pilot wave to determine the phase of an overtone power wave transmission. For example, the pilot wave frequency might be a half or a third of the power wave frequency. Nonlinear amplification of the pilot signal generates harmonics. The desired harmonic is selected by bandpass filtering followed by amplification. This converts the pilot signal up to the desired power wave frequency.

If the filtered power wave transmission is clean enough that it doesn't produce subharmonics that would interfere with the weak pilot wave receiver, then such a scheme should produce isolation between the pilot wave and the power wave. The biggest unresolved issue with this approach is the influence of the atmosphere. It isn't evident that the atmospheric phase delay at the fractional frequency pilot wave will be the same as the return phase delay of the phase conjugated power wave so this is not a preferred technique.

The preferred alternative is explored in association with FIG. 4. This is to have the pilot wave frequency be sufficiently close to the power wave frequency that atmospheric distortions are minimal and yet enough separated that the power signal does not interfere with the pilot signal.

The TR Module:

This example is for illustrative purposes only. Its intent is to show one possible method for isolating the weak incoming pilot signal, (111 of FIG. 1), from the very strong outgoing power signal (110). In this representative example most of the signal isolation is achieved through a relative frequency shift. As mentioned above, other isolation methods may be possible. This example also shows a method for adjusting the phase of the power signal to achieve phase conjugation.

Referring to FIG. 4, the TR Module 440 comprises two major components: a pilot wave receiver 450 and a power transmitter 460.

Single Master Oscillator: It is important to recognize that the TR module does not originate the power signal that is being transmitted back to the rectenna. Instead, it is modifying, and amplifying, a pilot signal that comes from a transmitter array at the rectenna. Thus, in this example, there is one master oscillator for the entire system and that oscillator is located at the rectenna.

Signal Polarization: The segmented antenna assumes that the power signals delivered from each power unit will coherently sum when received at the rectenna. To do so they must all have the same polarization. This sets two basic requirements: The first is that the pilot radio signals (111 of FIG. 1) sent from the pilot antennas at the rectenna up to the constellation of power units all have the same polarization (see FIG. 11 and associated discussion). The second is that the return power radio signals 110 from all the TR modules in the constellation have the same polarization, and this polarization matches the elements of the receiving rectenna.

The second of these two requirements implies that the antenna 401 of each TR module transmits back the same polarization that it receives. There is a need for axial wave symmetry here because most likely each power unit will have will have a somewhat different orientation. Circular polarization would satisfy the requirements for symmetry and coherent summation of the waves arriving at the rectenna.

TR Module in Detail: Each TR module of an example signal processor 400 shares an antenna 401 between the weak incoming single frequency pilot continuous wave (CW) pilot wave radio signal 111 from the rectenna and the powerful return wave 110 sent back to the rectenna. The power signal being transmitted is much stronger than the pilot signal being received from the rectenna. There needs to be complete isolation between the receive and return paths to prevent positive feedback.

One solution to this crosstalk problem, explored here, involves creating a substantial frequency offset between the transmitter and the receiver. As long as this offset is precisely the same for all of the millions of TR modules throughout the multiple power unit SPS system, coherent transmission from all the power units in the SPS to the rectenna will be maintained. Digital processing makes this possible.

In FIG. 4 the received pilot signal, from antenna 401, is passed through a duplexer 402 which allows the transmitter to share the antenna with the receiver. (An alternate arrangement would have separate, adjacent, antennas for receive and transmit. The positive feedback problem is the same with this arrangement because of diffractive coupling.)

The pilot signal together with a portion of the transmitter power signal is passed through a band pass filter 453. It is assumed for further discussion that the power transmitter frequency is downshifted with respect to the received frequency because this gives slightly better power transmission through the atmosphere.

Dynamic Range: As will be described below in association with FIG. 11, the pilot wave 111 emitted from the rectenna will be highly directional and focused to spread only across the constellation. This means the amplitude of the received signal will still be substantial even though weak. For the example constellation, evaluated here, a one kilowatt pilot signal will produce a received signal of about 5 millivolts amplitude from the antenna 401 which is assumed to have an impedance of 50 ohms. Conversely, the outgoing power signal will deliver a voltage amplitude of 25 volts at the antenna. The duplexer 402 reduces this voltage to about 2.5 volts before passing the power signal to the phase receiver chain. Thus there is a voltage amplitude ratio of 500:1.

To separate the weak received pilot signal from the far stronger outgoing power signal we need to reject the power signal with a bandpass filter 453. This filter passes the pilot signal frequency and strongly rejects the frequency of the power signal. This filter must be active because passive microwave filters do not have enough rejection. An active filter heterodynes the signal down to a relatively low intermediate frequency for very sharp selective filtering. This is followed by an upshift of the now isolated pilot wave signal back to its original frequency and phase.

The filtered pilot signal is then sent to a splitter 405. One output from the splitter is phase adjusted 406, using the phase conjugation phase adjustment from 422 from the timing receiver. This phase adjusted signal is then sent to the transmitter's mixer 407.

The second output from the splitter is digitized 454 and the digitized sample sequence goes to a subharmonic generator 408 which delivers its output to the mixer 407 after being converted back to a continues wave (CW) signal.

The subharmonic generator 408 is a key device necessary for this scheme to work. In its simplest version what it does is to subdivide the sampled pilot signal frequency $2^n$ times by combining digital samples.

As an example, a frequency subdivision of a 2.45 Ghz Nyquist sampled (i.e. $4.9 \times 10^9$ samples per second) signal by $2^6=64$ provides $7.66 \times 10^7$ samples per second, or a Nyquist satisfied frequency of 76.6/2=38.3 Mhz frequency output. This is converted back to a continuous wave. When mixed with the phase conjugated base frequency of 2.45 Ghz, the result is a precise frequency shift down, by 38.3 Mhz, to a frequency of 2.41 Ghz.

The actual amount of frequency subdivision to be used is determined by system considerations. Other digitally controlled frequency shifting devices are available, but all work by means of a sequence of divisions of sampled frequencies.

In this example the return frequency is shifted by 1/64 of the pilot wave frequency. At a pilot wavelength of about 12.2 centimeters the power signal will have a wavelength increase of about 2 millimeters ($\lambda/64$). The wavefront aberration that results is too small to significantly influence the efficiency of the power transmission.

After the derived subharmonic sampled signal is converted to a continuous oscillation it is delivered to the mixer 407. The carrier signal from device 406 is modulated by the frequency produced by the subharmonic generator. The modulation produces frequency shifted side bands.

The output from the mixer is passed through a filter 409 which selects the desired sideband. The filtered signal is amplified 410 to create a power signal, then delivered to the duplexer 402 and then to the antenna 401 for emission (110 of FIG. 1).

Typical microwave duplexers use a circulator. This is a waveguide device with three ports. The output is always the first port after the input port. In this application the transmitter would input to the first port and output from the second port which leads to the antenna 401. The received signal from the antenna 401 is injected into the second port and exits through the third port and then proceeds to the band pass filter 453.

The problem with this arrangement is that the best available microwave circulators have only about 20 dB isolation between the transmitter and the receiver. The result is only a factor of ten reduction in the power signal voltage at the bandpass filter 453. This is nowhere near enough isolation given the tremendous power disparity between the weak received pilot signal and the very strong transmitted signal. It is for this reason that a significant frequency offset between the received signal and the transmitted signal, together with rejection filtering of the transmitter signal, is necessary.

Doppler Shift: Because a power unit is in a slightly more eccentric elliptical orbit relative to the orbit of the master control unit, each power unit will have a time dependent doppler shift. Because the doppler frequency offset is very small it could simply be accepted as a minor aberration of the wavefront.

Let's check on this: A good orbital model treats the power units as rotating in an epicycle around the control unit's orbit. This is a good approximation to the true elliptical orbit. The outer most power unit's epicycle has a radius of five kilometers in this example architecture. The period of the epicycle is 24 hours. The maximum radial velocity of a peripheral power unit with respect to the Earth peaks at about 0.32 meters per second, twice a day, with a maximum two way doppler shift of less than six hertz. The resulting aberration is too small to matter.

Multiplexing by Power Interuption:

Referring to FIG. 5, an alternative multiplexing scheme 500 periodically interrupts the power transmission. This provides quiet intervals for observation of the weak pilot wave signals. This technique is commonly known as half-duplex. It is used in monostatic radar. It may be the simplest solution to the problem of multiplexing a weak pilot signal with a strong power transmission. Note that the power units are different distances from the rectenna. Thus there must be coordination in temporarily silencing the all the power units simultaneously so that the weak pilot signal can be heard by all members of the constellation.

Local Master Oscillator In the concept shown in FIG. 4, the continuously transmitting TR module modifies the pilot signal from a master oscillator at the rectenna and retransmits it. This means that all the power units in the constellation are retransmitting a frequency shifted version of this single oscillator. The constellation as a whole has a single master oscillator much like a conventional active phased array antenna. This is conceptually equivalent to the double slit experiment in both classical and quantum physics. The desired diffraction is guaranteed to work.

By way of contrast, each power unit in an interrupted multiplexing SPS system, such as that of FIG. 5, must generate its own signal from scratch. Its frequency, phase and polarization are periodically monitored and corrected using signals sent from the rectenna, so the transmissions are all on precisely the same frequency and are phase locked together. Nevertheless, each power unit generates its own power transmission, and emits its own photons.

This situation is very different from the double slit experiment. A close look at the quantum physics is necessary to see if this scheme will work. Let us see why both experiment and theory agree that this SPS system will produce the desired classical diffraction pattern.

The explanation is that the emitted photons are Bose particles (i.e. they have integer spin). If the photons have exactly the same frequency and polarization, regardless of their source, then they become indistinguishable and interchangeable. It is the nature of indistinguishable Bose particles that they associate together to create a measurable macro quantum state. For photons this is commonly interpreted as a classical electromagnetic field.

There are several examples of this macroscopic association of Bose particles: Recruitment of additional Bose photons as the photon wave passes over excited atoms, creates the coherent light from a laser. Collections of integer spin entities at low temperatures also may join together in a "Bose-Einstein condensation." For example, helium atoms are naturally Bose particles and at very low temperature they condense to produce a superfluid with remarkable properties. In certain solids at low temperatures, through their interaction with the crystal lattice, half spin electrons pair together to make integer spin Bose quasi-particles. What results is electrical superconductivity.

In an independent oscillator SPS constellation, identical frequency photons from different transmitters engage each other during their free space propagation to the rectenna. The power units individually emit a spreading wave of photons. When these emitted waves overlap down-stream, the various identical photons, because they are identical bosons, will join up so as to create a single state probability wave that is measurable as an electromagnetic field. Since the photons are indistinguishable and interchangeable, once in association they cannot be individually traced back to their original source. It is this Bose particle recruitment, and lack of individuality, that generates the desired classical far field diffraction pattern.

Task Sequence: Referring to FIG. 5, there are three microwave transmissions of interest. At low intensity periodically transmitted is a first type time mark alert signal 501, with frequency OA. In a preferred embodiment this frequency is different from that of the microwave pilot signal Op 503, which is coming from the distant calibration source (i.e. the rectenna).

The time mark alert signal 501 is transmitted, from a time mark alert control 514, simultaneously to all power units in the constellation. Its primary purpose is to coordinate the cessation of the power transmissions from all the various power units so that all units can hear the pilot wave.

The second type pilot radio signal 503 establishes the frequency Op and basic phase and polarization for the system as a whole. The pilot signal is microwave transmitted from a distant calibration source up to each power unit. The third signal is the high power phase conjugated microwave power wave transmission 505 sent from the power unit back down to the rectenna. Its frequency is also that of the pilot signal, $\Phi_P$.

The pilot wave detection and the power wave transmission occur at different times. So the device that accurately tunes the power wave frequency to the pilot wave frequency, and keeps it tuned until the next alert, will likely need a very stable clock 511 and oscillator 504. The clock 511 is synchronized with a master clock on the master control unit 512 by first type communication 513.

Periodically a time mark alert signal 501 is transmitted from a time mark alert control 514 and is received by a power unit. The origin of the alert signal is arbitrary. It might come from the master control unit, which is preferable, or it might be transmitted from the rectenna. The alert signal 501 establishes a brief time gate 506. This gate turns off the power wave 505 transmissions from all the power units in the constellation in coordinated fashion so that each power unit can hear the pilot wave signal 503. Briefly silencing the entire constellation prevents the lower altitude power units from being saturated by the power transmissions from higher altitude power units.

It takes time for a time mark alert signal to propagate through the constellation. Thus, the larger the diameter of the constellation the longer the power wave transmission must be shut down. For a constellation 10 km in diameter the propagation time from the highest altitude to the lowest is 33 microseconds. The time gate 506 must be substantially longer than this so as to get a good frequency and phase measurement of the pilot signal 503. The excess duration should be enough to establish the frequency center with sufficient precision to keep the phase error equivalent to a small fraction of a wavelength.

Even with a large constellation, the power signal is likely to be turned off for less than a millisecond with each new pilot signal measurement. Thus the power duty cycle will remain very nearly 100%.

Once the time gate 506 is opened for reception of the pilot wave 503 a measurement 507 of the phase and frequency of the pilot wave signal is made. This will most likely involve clock controlled digital sampling and correlation similar to the method used in the Timing Receiver 430 of FIG. 4. However, now the digitization is working directly on the pilot wave signal rather than on stripped-off modulation.

Because the pilot signal is continuous (CW) the most useful technique for signal processing the pilot wave is a Fourier Transform. This transform creates the necessary gradient structure for correlation analysis. A digitized version of the pilot signal is Fourier transformed and then the algorithm of the Appendix may be applied to the resulting spectrum to estimate the true frequency and complex phase with respect to the Fourier domain samples.

The Z-range 509 information is determined from the interaction of the power unit with the master control unit and a distant calibration source. Using Z-range information the needed phase conjugation 510 is determined. This information is used to govern the frequency and phase of a stable oscillator 504 which is tuned to operate at the pilot frequency $\Phi_P$ 503. The oscillator is stabilized by the power unit's precision clock 511 which is synchronized both in time and sampling to the clock and sampler on the master control unit 512.

The output from the oscillator is amplified by a power amplifier 508 which generates the power output emission 505.

A New Application—Solar Power Satellites:

The new method of calibrating a large antenna, described above, facilitates a constellation of comparatively small solar power satellites (SPS) flying together in a geosynchronous orbit. These satellites collect energy from the sun and transmit it, via microwaves, directly to a collecting rectenna on the ground. For convenience, these modest size solar power satellites are here called "power units." In a preferred architecture these would fly in formation in geostationary orbit although other orbits are possible. The power units should be sufficiently separated that they do not significantly shadow or eclipse one another. In some architectures this means a separation, unit to unit, of more than a hundred meters.

Communication with the ground is via a coherent two way second type microwave radio link directly between each power unit and the ground rectenna and its associated distant calibration source. As with some previously proposed systems, a microwave pilot wave transmission from the distant calibration source is sent up to the constellation. In a preferred architecture the pilot wave provides a phase reference for transmission of the high power microwave beam back to the ground.

In addition, the invention introduces a new feature: periodically a timing signal is sent from the rectenna to coordinate the phase activity of the various power units in the constellation. The time marking signal is used to determine the distance of a power unit from a time reference surface. This time marking signal, and its associated time reference surface, is a novel contribution of this invention and must be incorporated in preferred architectures. In combination, the pilot wave and timing signal are used to bring all of the power unit microwave transmissions into phase at the rectenna.

System Advantages: Earlier gigawatt SPS concepts assume the construction of a single giant, and massive, unified structure typically several kilometers in size. This requires robotic assembly on-orbit. The invention's SPS power unit constellation concept may have the same solar energy collection area but it does not require such an on-orbit robotic assembly. This is because the SPS is composed of comparatively small, free-flying, and independent, power units. Each of these power units is delivered to orbit separately and each operates autonomously but in coordination with a master control unit.

The power units would be mass produced and identical and therefore relatively cheap. An individual power unit is small enough to be easily transported to the specified geostationary orbit. Because of its small size each power unit can be folded into a compact form so as to easily fit into a rocket's payload bay. It will be unfolded in Low Earth Orbit (LEO) so that it can use its own solar energy collection to transport itself to Geosynchronous Orbit (GEO) using electric propulsion. Once positioned in the GEO constellation, each power unit is immediately ready to supply power to the Earth.

Because the power units are physically independent they can be distributed over a large volume and will still work coherently together. Coherence is insured because their transmissions are governed by phase and timing signals received from the ground and coordinated in space by a single master control unit. The power unit system is scalable from a few power units in initial operation to constellations greater in capacity than the conventional unified structure concepts.

Another very great advantage of this concept is that a small power unit can easily be articulated to simultaneously track the different apparent motions of the sun and Earth as the power units orbit the Earth. The previously proposed giant SPS structures have difficulty with this combination Sun-Earth tracking. As discussed below, the solar collector follows the sun while the antenna array separately must follow the Earth. With a conventional large and massive structure this is very difficult to achieve.

Finally, the components of any satellite degrades with time. Space, after all, is a harsh environment and entropy always rules. Free flying power units are more easily replaced than parts of a large integrated SPS structure. So, there is potentially a major savings in maintenance cost. Replacement power units can also more easily be upgraded with new technology.

Example Architecture:

The many new ideas introduced here show their merit by applying them to an example disarticulated Solar Power Satellite (SPS) system. The example given here is for illustration purposes only. Other architectures, and configurations, are possible with the new antenna calibration invention.

Figure 6:
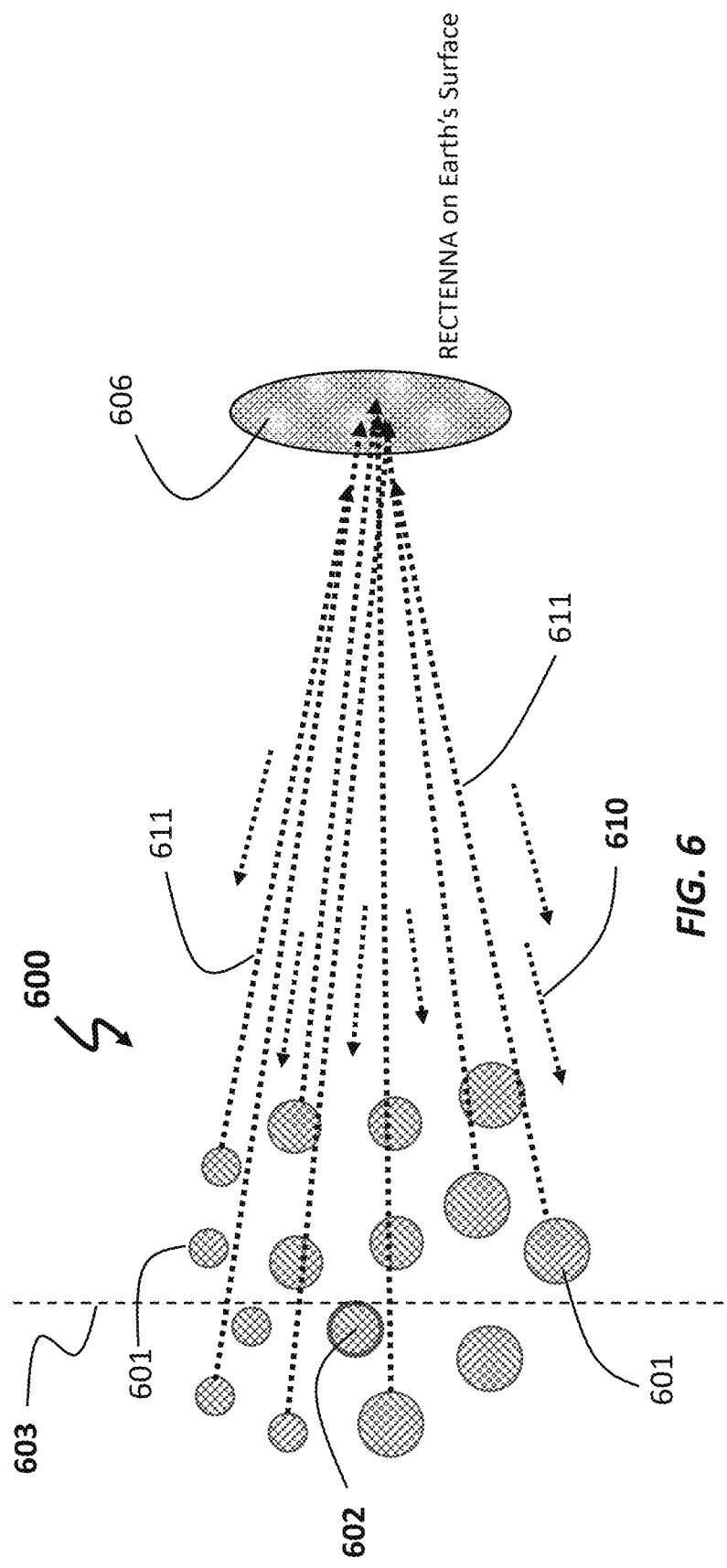
FIG. 6 is a conceptual illustration of a constellation of separate, but coordinated small solar power satellites, called "power units," in communication with a rectenna on the Earth's surface.
Figure 7:
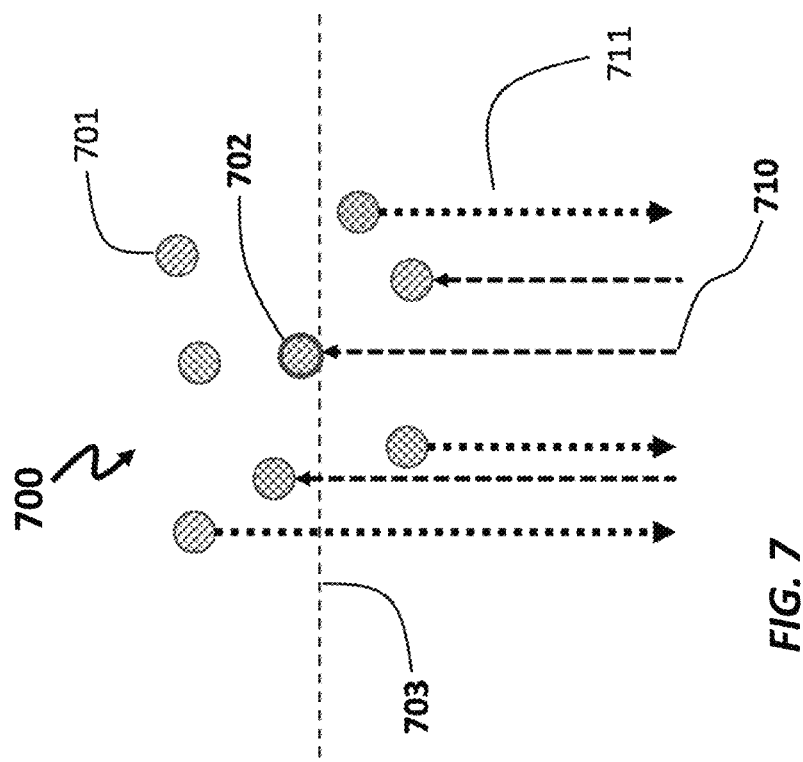
FIG. 7 is a representation of orbiting power units with the definition of the "time reference surface" being perpendicular to the line of sight to a rectenna on the Earth.

This example constellation architecture is illustrated by FIGS. 6 and 7. Referring to FIG. 6, this figure schematically depicts a constellation 600 of thousands of solar power satellites, or "power units." Each power unit 601 absorbs sunlight and converts this energy into a high power microwave transmission 611 to a Rectenna 606 on the Earth.

Communication with the Rectenna: In this architecture, microwave transmission is similar to that of a conventional SPS. Microwave Pilot and timing signals are transmitted from within the rectenna on the Earth to the SPS constellation in a geostationary orbit. Their purpose is to provide a frequency and phase reference signal and time coordination. A new device is a master control unit 602. This control unit establishes the location of a virtual time reference surface 603. It also provides first type communication means with each power unit to know its position relative to the control unit and the time reference surface.

The phase control pilot signal 610 from the rectenna 606 is phase conjugated by each power unit 601 and is amplified so as to send a high power microwave beam 611 back to the rectenna 606.

Referring to FIG. 7, consider the time reference process 700. A novel element is the use of periodic time, frequency and phase coordination microwave signals 710 sent by a distant calibration source in the rectenna to the power units in the constellation. These time marking signals are used to establish the phase relationship of each power unit with respect to a virtual time reference surface 703.

A central control unit 702 establishes the time reference surface 703 and, using first type communication, in coordination with second type microwave radio signals from a distant calibration source, assists in determining the temporal positions of the antenna segments mounted on the various power units 701. The time marking signals 710 make possible the creation of a very large scale phased array antenna. These signals do so by completing the measurement of the relative time locations of the power units. The result is a system-wide synthetic aperture antenna able to very precisely transmit power 711 down to the rectenna using microwave signals. The antenna segments of the power units 701 making up the synthetic aperture phased array behave as if they were coherently transmitting from the time reference surface 703.

Power signal phase control: In FIG. 7, one particular unit 702, serves as the coordinating master unit for the constellation as a whole. This coordinating control unit does not have to be a power unit although it may be. This control unit 702, acts to synchronize the various clocks and digital samplers in the constellation. It also provides the means for each power unit to know its location relative to the control unit and the time reference surface.

The control unit establishes a virtual time reference surface 703. The time reference surface is perpendicular to the line of sight between the constellation's master unit and the center of the rectenna on the ground. This also means that the pilot and timing signal's wavefront is parallel to the time reference surface at the location of the master unit.

The time reference surface 703 is the key to making this concept work. It acts as a virtual phased array antenna to retroreflect the incoming pilot frequency and phase signal 710 to create an outgoing high power microwave transmission 711 that proceeds directly back to the rectenna. The way this works, the power transmission from each of the power units 701 is phase adjusted so that it appears to be transmitting, with the appropriate phase, from the time reference surface. This ensures that after phase conjugation the phases of the various power transmissions will be identical when received at the rectenna. Local phase adjustments compensate for any curvature in the wavefront being received in the pilot signal from the rectenna when sending the power transmission back to the rectenna.

Referring further to FIG. 7, the time reference surface may be placed at any distance from the rectenna to the constellation. However, in a preferred embodiment, it is convenient to pass the plane through the antenna of the master unit 702. If the time reference surface is displaced from the master unit the range from this unit to the reference plane must be defined precisely and its distance from the master unit must be communicated to each power unit in the constellation. The master unit also measures the range from itself to each of the power units 701 in the constellation. And it also establishes a master periodic time check for the constellation.

To establish a frequency and phase reference for the constellation as a whole, a pilot signal, also designated 710, is transmitted by one, or more, transmitters within the confines of the rectenna. This pilot signal is received and phase conjugated by each power unit. The phase conjugated signal is used to transmit a high power microwave 711 from each power unit back to the rectenna. All these power microwaves are phase coordinated in such a way that the entire constellation acts as a mutually coherent active phased array antenna. When this is achieved the power signals from each of the power unit segments will arrive with the same phase at the rectenna and will sum coherently.

Constellation Size: A typical constellation would likely comprise thousands of power units spread over a volume several kilometers in diameter. The constellation size and arrangement must be such that nearby power units rarely eclipse one another. Typically, these power units will be distributed throughout a spherical volume although other distributions, such as a planar one, are possible.

The size of the individual power units will depend on two factors: 1. The total power delivered by the constellation to the rectenna, and 2. The need for periodic update synchronization of the clock in each power unit. This is because the power units are in slow relative motion with respect to the master control unit. The periodic update factor determines the number of power units that might be in the constellation and therefore the amount of power each unit must deliver.

Clock synchronization addresses each power unit individually and in sequence. That means that the synchronization process must rotate around the constellation. Since addressing each power unit takes finite time there is a trade between the revisit interval and the number of power units in the constellation. The revisit time must be kept short enough that the clocks are maintained in sync to the necessary accuracy.

It should be noted that simultaneous synchronization of multiple power units is possible if multiple microwave frequencies, or multiple spread spectrum coded modulations, are used for communication with the various power units. The number of power units in the constellation, and their size, is then determined by the complexity of the master control unit.

The Example Architecture in More Detail:

Constellation Size: The maximum number of power units in a constellation is determined by the interrogation time between the central control unit and an individual power unit. It is also influenced by the need for safe spacing between power units.

The time required to determine the R-range time delay (105 of FIG. 1) is a maximum of two half propagation times across the constellation. This is followed by adding a range report taking a half propagation time where the control unit tells the power unit its R-range. Add in at most a few microseconds for processing and we find out the maximum number of interrogations per second for each such frequency channel. Add frequency channels and the possible number of power units increases.

For example, a ten kilometer wide constellation would have a maximum signal propagation time for a periphery power unit of $3 \times 0.5 \times 10^4$ m/$3 \times 10^8$ m/s=50 microseconds. This establishes a 20,000 interrogations per second limit for each frequency channel. Closer in power units would require less time. A volume filled constellation of 10,000 power units could be R-range measured faster than twice a second.

Obviously a much larger constellation than ten thousand could be accommodated. For example a constellation with a hundred thousand power units could deliver the same total power with each power unit being a tenth the size. System trade studies will provide the optimum solution. For illustration purposes we examine just one typical constellation. Subsequently, it will be shown how the system scales with the number of power units in the constellation.

Example System: Consider a constellation of 10,000 power units in total delivering a gigawatt of microwave power with 80% transmission efficiency. Each power unit would need to microwave radiate 125 kilowatts of power. The example constellation is a filled sphere with a diameter of 10 kilometers.

Operating Frequency: With conventional unified structure SPS concepts there is need for the most compact antennas possible at both the satellite and the ground rectenna. This pushes the frequency as high as possible. A major constraint is that the microwave beam must pass through the Earth's atmosphere. This limits the maximum frequency that can be used. In turn, the frequency limit defines the minimum size of the power transmitting antenna. For the highest available frequency such an antenna would have to be on the order of a kilometer in diameter. Lower frequencies require even larger antennas.

Two operating frequencies for SPS systems are under widespread discussion. These are 2.45 Ghz and 5.8 Ghz. Some advocate a 10 Ghz frequency even though there is increased atmospheric path loss at this frequency.

The disarticulated system, introduced here, synthesizes a power transmitting antenna several kilometers in diameter. It therefore can produce a much more compact beam spot at the rectenna. This has the advantage that the SPS can use longer wavelengths and lower frequencies and still produce compact far-field illumination. Such a system is easier to achieve than the higher frequency concepts. The large size of the constellation means that the return power beam can, if desired, be focused into an area on the ground much smaller than the expected size of the rectenna. This useful feature is later discussed in association with FIG. 11.

Accordingly, for this example architecture, the frequency is specified as 2.45 Ghz with a wavelength of 12.2 centimeters. Coordinating communication frequencies may be substantially different than this.

Figure 8:
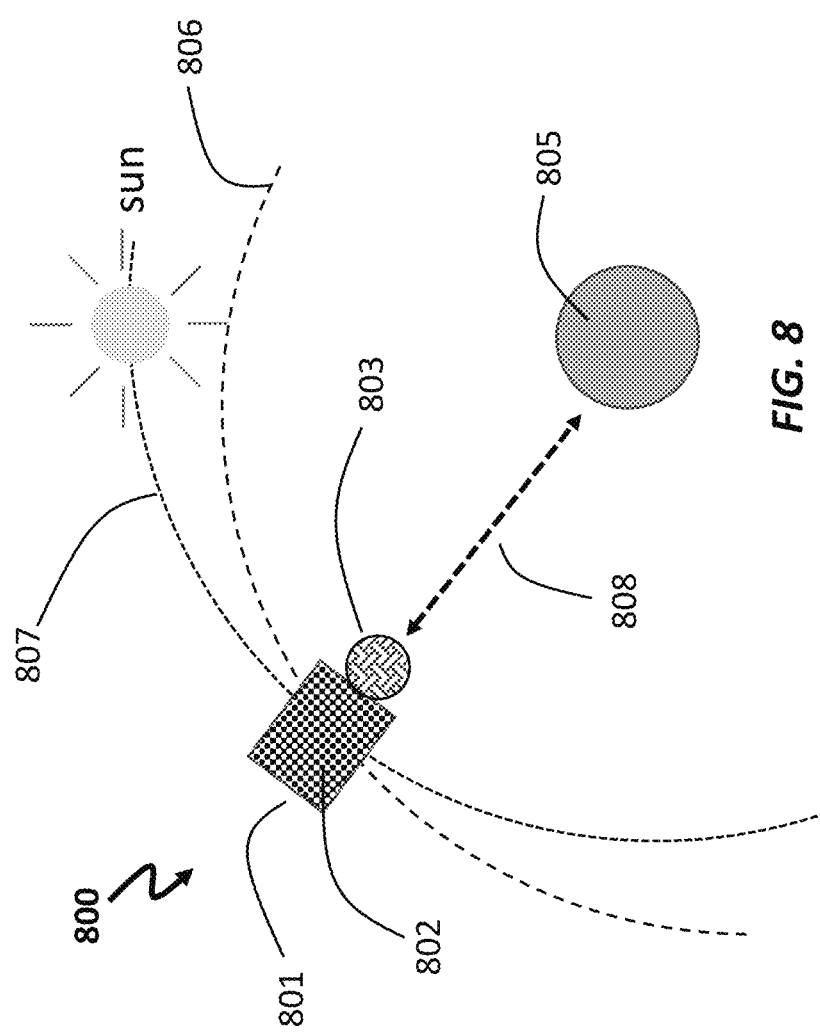
FIG. 8 is a schematic example of one of these power units in geosynchronous orbit receiving energy from the sun and transmitting that energy to a rectenna on the Earth.

The Power Unit: FIG. 8 provides a schematic illustration 800 of one particular power unit 801 in geosynchronous orbit 806. Each of the many power units has two principle power elements: a collector of solar energy 802, and an active antenna array 803 to send this energy to a rectenna 805 on the Earth using two way microwave communication 808. The antenna is best oriented to face the rectenna on the surface of the Earth. The solar collector 802, on the other hand, faces the sun. Its orientation is governed by the sun's ecliptic 807. The relative Earth-sun directions vary over the course of a daily orbit.

The solar collector might be an array of semiconductors. Or, it might use a mirror to focus the sunlight on an electricity creating device. Here, for illustrative purposes, we consider a semiconductor solar panel. This is the preferred embodiment. The antenna is assumed, for illustrative purposes, to be an integrated phased array antenna attached to the solar collector. This, too, is the preferred embodiment although other transmitter/antenna combinations are possible within the scope of this invention.

Embedded in this phased array structure are a large number of independent transmitter/receiver (TR) modules like those of FIG. 4. Each TR module has its own antenna sub-aperture. As also illustrated by FIG. 2, coherent beam steering employs phase conjugation (as described in association with FIGS. 2 through 5) of the pilot signal received by each TR module from the distant calibration source on the Earth.

A given power unit is in a slightly modified geostationary orbit, and is in epicyclic rotation around the control unit. The power unit's antenna is always pointed at the Earth. Even though the satellite appears nearly stationary with respect to the Earth, the solar collector still must point at the sun. The satellite, in its geosynchronous orbit 806, circles the Earth once a day. The Earth pointing antenna 803 must therefore rotate 360 degrees once a day with respect to the fixed stars. Conversely, the sun moves very slowly with respect to the stars. Over the course of a year the sun appears to traverse along the ecliptic 807 at the rate of one degree per day. The ecliptic is tilted with respect to the Earth's equator by 23.4 degrees. This means the sun will be visible all of the year except for a very brief period at the equinox.

It also means the combined relative motion between the solar collector and the antenna is about 361 degrees each day. Because of these disparate motions of the antenna and the solar collector some form of articulation between the two is required.

Figure 9:
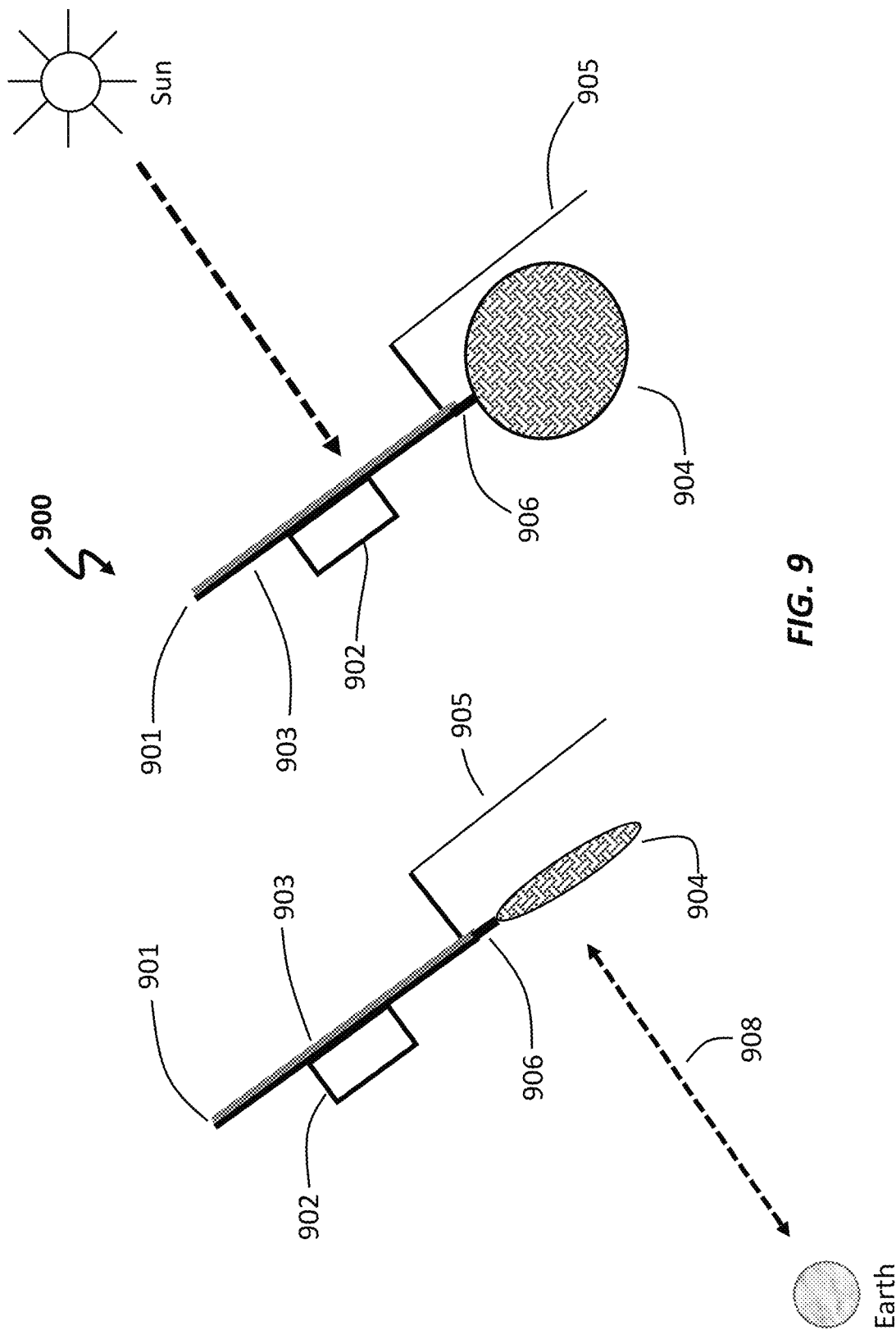
FIG. 9 is an example of an articulated power unit showing a solar panel, a microwave antenna and the utility bus of the space craft.

Articulation: FIG. 9 shows a possible example 900 of an articulated power unit. The components of the power unit 901 are a bus 902, a solar panel 903, an antenna 904, a sun shade 905, and a mechanism 906 to articulate between the antenna and the solar panel. The power unit's antenna 904 must always point to the Earth for microwave two way communication 908. The solar panel 903 points towards the sun. The figure shows the antenna in two different orientations. To keep the antenna cool it must be shaded by an optically opaque but electrically transparent sun shade 905. For convenience this sun shade could be attached to the solar panel, as shown.

Figure 10:
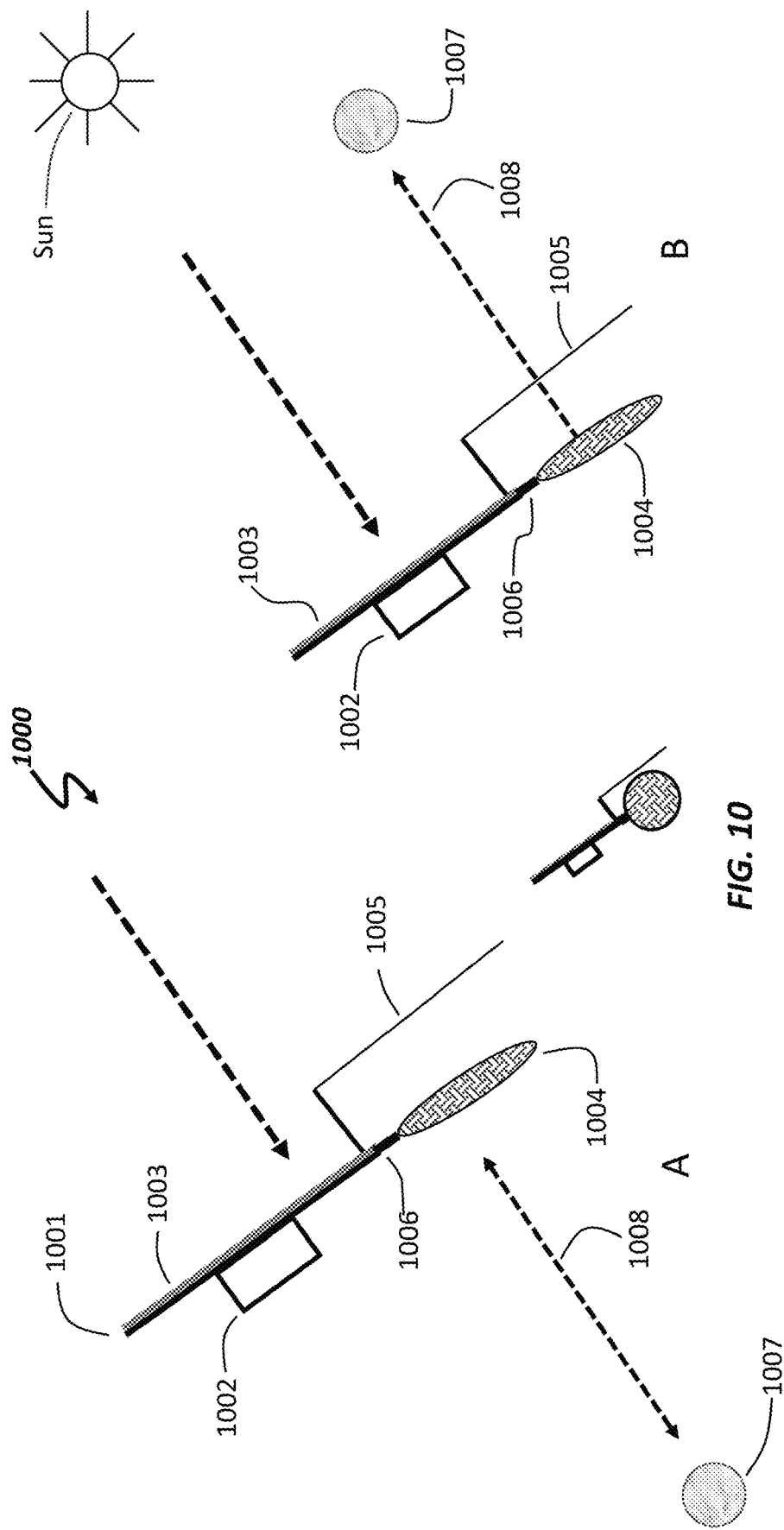
FIG. 10 is a depiction of a power unit in two different positions during its daily orbit. One position is on the day side of the Earth the other is on the night side.

FIG. 10 shows the situation 1000 at two different times of the day.

In FIG. 10A a solar panel 1003 of a power unit 1001 is facing away from the Earth 1007. A bus 1002 provides all the necessary service functions needed for the power unit to act as a spacecraft. An antenna 1004 is always facing the Earth and is in microwave communication 1008 with a rectenna, and distant calibration source, on the Earth. In FIG. 10A it is day on the Earth. In FIG. 10B the solar panel 1003 is pointing more towards the Earth. It is night at the rectenna 1007 and the sun now is on the other side of the Earth. In FIG. 10B the power unit is on the night side of its orbit but it is still solar illuminated except for two brief periods each year at the equinox. The antenna 1004 still must be shaded by a sunshade 1005 to keep cool. An articulation device 1006 provides the relative orientations of the antenna and the solar panel.

Constellation Design: There are many possible embodiments of a constellation of free flying power units. For illustration purposes we assume the power units are distributed within the bulk of a sphere. The constellation diameter, in this example, is selected to be ten kilometers. The resulting coherently phase conjugated transmission to the far field will, because it is focused by the conjugation, create a compact central lobe, called a Point Spread Function (PSF) with nearly a Gaussian profile. The diffraction sidelobes will be patterned in a complicated way depending on where the power units are located at any given moment.

A constellation 10 km in diameter, with 10,000 power units, would have a spacing between power units of about 460 meters if the constellation is a uniformly filled sphere. This should be enough that mutual eclipsing will not be a problem. If necessary the constellation can be spread out even further.

Synthetic Antenna Size: A major issue with microwave power transmission from space to Earth is the size of the power transmitting antenna. The width of the focused high intensity PSF is inversely proportional to the diameter of the antenna—and therefore, in this case, the antenna size is the diameter of the constellation. In this architecture the power antenna is synthesized with its elements distributed throughout the constellation. Because of the large constellation diameter, the PSF beam width projected on the ground can be very narrow—substantially less than a kilometer in width. Such a narrow beam would create a very high intensity, and dangerous, spot on the ground. It raises a safety issue which is resolved with further invention as described below in association with FIG. 11.

Rectenna Size: For reasons of safety the incident flux at the rectenna must be kept below a limit of 100 watts per square meter. For a one gigawatt system, to meet this safety standard the rectenna area cannot be less than $10^7$ square meters, or 10 square kilometers. The minimal diameter of a circular rectenna is therefore 3.5 kilometers. A diameter of 5 kilometers is significantly safer and more likely.

Power Division: In the example system, with $10^9$ watts delivered by $10^4$ power units, each power unit must transmit at least $10^5$ watts. The wave being transmitted to the ground is unmodulated. A microwave power amplifier transmitting an unmodulated wave is about 60% efficient. This means, given some system losses, that any solar panel will have to be greater than 1.67 times as big as a lossless transmitter would normally require. It also means that the antenna must shed a substantial amount of waste heat into space. In addition, there will likely be propagation losses.

Solar Panels: A rough calculation assumes a current state-of-the-art space qualified solar panel which provides about 300 watts per square meter. A constellation that delivers a gigawatt of power, with 80% transmission efficiency, at the start of life will require $1.67 \times 10^9/(300 \times 0.8) = 7 \times 10^6$ m$^2$ of collecting area. If we have 10,000 power units, for one gigawatt delivered power, the solar panel on each power unit would have a collecting area of 700 m$^2$. A square solar panel would span roughly 27 meters on each edge.

Thermal Management: Typically, the current generation of solar panels for satellites have an operating temperature of 130° F., with the back of the panel acting as a black body radiator. The antenna array must operate at a much lower temperature so it needs shading. The sun shade needs to be optically opaque but electrically transparent. Since the antenna must radiate its excess heat the shading arrangement must be sufficiently open that the antenna's black body radiation can escape to cold space.

A power unit's phased array main microwave antenna is comprised of a large number of Transmit-Receive (TR) modules. Assuming 80% transmission efficiency from space to ground, each TR module of a power unit's antenna must transmit 12 watts. At 60% electrical efficiency it will consume 20 watts of power. That means that 8 watts is waste heat and must be radiated into space. With a radiating temperature of 300° K (80° F.) the radiator must have an area of 175 cm$^2$ for each TR module. This means the modules must be spaced a minimum of 13 cm apart. (The spacing might be greater.) Alternatively, fins can be employed to increase the radiating area so that the TR modules can be more closely spaced and the antenna diameter reduced.

Antenna Size: If each TR module transmits 12 watts of power we would require $10^4$ modules to deliver $10^5$ watts. A circular array with $10^4$ TR modules, with 13 cm intervals, would have a diameter of 15 meters.

Orbit Considerations: The constellation of power units is a time varying three-dimensional structure with semi-random spacing between the units. Each power unit will be in a very slightly different orbit with differing orbit inclinations, ascending nodes, eccentricities and ellipse axes. Each power unit will behave as if it is following an epicyclic orbit around the master control unit.

While each power unit is free flying its specific orbit must be chosen with some care. Consider a unit's placement with respect to an ideal geosynchronous orbit. At some reference time those units which are initially north of this ideal orbit will move south for half of the orbit. Conversely, those initially south will, at the same time, move to the north side. Thus the orbits of the initially north and south units will interleave periodically. The same exchange results from power units being at slightly different altitudes. Without diligence these various satellites could collide. Thus, there will have to be some rules for establishing the orbits of the power units. These rules will likely not be too stringent and will give each power unit some placement wiggle room.

Antenna Coverage: In the preferred embodiment each power unit will have a phased array antenna segment which is capable of steering the transmitter beam over an angle capable of covering the specified latitude and longitude of the rectenna on the ground. Beam steering for the constellation as a whole is automatic because of phase conjugation.

From GEO the Earth subtends ±10 degrees. To get full Earth coverage through beam steering, the spacing for each TR module must be less than 70 cm. Thermal control allows spacing TR modules of 13 cm, so substantially more than the Earth could be covered with electronic beam steering.

As previously noted, for a large antenna segment there can be a substantial time difference between the time the power unit's central clock receives the time marking signal and the time received at each TR module. Only if the antenna segment is perfectly parallel with the time reference surface will this time difference zero out. This may not always be the case. Therefore individual timing measurements at each TR module may be needed.

On the other hand, by accurately pointing the antenna directly at the rectenna the phasing of the antenna modules can be greatly simplified. With such pointing the antenna will be parallel to the time reference surface. Optical means, described below, make this possible.

Antenna Structure: Minimizing the antenna weight is critical. Ensuring structural flatness for a phased array therefore is an issue, particularly since there are time varying mechanical and thermal loads. Real-time antenna calibration means the structure can be very light weight and accept a certain amount of flexing. By the time the pilot wave reaches the power unit it will, for all practical purposes, be smoothed out to have a flat phase front over the limited size of a power unit's antenna. It can thereby serve as an infinitely far away calibration source.

Optical Antenna Pointing:

A small telescope can significantly reduce the complexity of the power unit's electronics. Let's assume that the antenna can be precisely pointed towards the rectenna on the ground so that phase compensation for the relative tilt of the antenna is not necessary. Then all the TR modules can share the information from a single timing receiver.

How accurately must the antenna be pointed? A circular fifteen meter diameter antenna, with an operating wavelength of 12.2 centimeters, will paint a PSF spot on the ground with one sigma radius of 135 kilometers. This corresponds to an angle of 0.2 degrees. Pointing accuracy should be at least ten times better than this, or 0.02 degrees (360 microradians), to get proper illumination of the rectenna. This small angle gives a total edge-to-edge antenna tilt of 5 millimeters.

Optical tracking techniques make the required pointing alignment relatively easy. For example, a laser on the ground, pointed at the constellation, could provide an angular direction reference. The laser beam would have to be defocused so as to encompass the entire constellation. A relatively small telescope mounted on the power unit's antenna, with an aperture of a few centimeters, would be able to locate the direction to the laser to a microradian—provided the received beam intensity is sufficient. This gives enough pointing accuracy to easily place the return power beam on the rectenna. With a clear sky above the rectenna the laser would presumably be at the center of the rectenna. If the sky is locally cloudy then three auxiliary lasers in remote clear sky locations would do the job.

Star Tracker: If the orbital elements of a given power unit are known then the real-time direction to the rectenna can be computed open loop using a star tracker on the antenna segment of the power unit. For a 15 meter antenna a half centimeter edge misalignment is less than a milliradian of angular error. This accuracy of pointing is easily obtained with standard star tracking techniques.

Antenna Diffraction Effects:

The far field diffraction pattern of an antenna comprises a compact, high intensity central lobe surrounded by sidelobes of much less intensity. For a well-designed circular antenna about 80% of the radiated power will be in the PSF's central lobe which approximates a gaussian profile with a ring of close-in sidelobes. For a circular aperture the sidelobe intensities form circular ripples which are relatively high near the central lobe and taper off in intensity with radial distance from the center of the beam.

Random phase defects will also broaden the far field point spread function. Even so, with a constellation of power units spanning several kilometers, the diameter of the far field PSF, and its sidelobes, would typically be much smaller than the extent of the rectenna. Most of the sidelobes would still be swallowed by the rectenna. Therefore, a substantial phase error could still be tolerated and still get a suitably compact point spread function together with its surround of sidelobes.

Antenna Geometry: For the example architecture under discussion there will be ten thousand power unit antenna segments, each with a 15 meter diameter antenna. Assume these are randomly scattered in a ball ten kilometers in diameter. The time reference surface acts as a virtual antenna with all the antenna segments projecting onto this surface so as to appear to radiate from this surface.

The ten thousand power units will have an average spacing, in three dimensions, of about 460 meters. When projected onto the time reference surface the average projected spacing will be about 100 meters. The spacing density of sub-apertures will be nearly constant until three quarters of the way to the edge of the formation where the projected spacing is increased. Here the peripheral density is still two thirds of the central density. Beyond this point there is a continued reduction in segment density to zero at the edge of the constellation. The result is an apodization of the collective antenna which slightly broadens the central peak of the PSF and reduces its peak intensity.

With a 100 meter average spacing of the projected antenna segments the combined array of 15 meter antenna segments will be sparse. The fill factor is only about 2 percent. This sparseness creates significant diffraction effects. There are two regions of interest in the far-field (the Fraunhofer region).

The central region behaves as if the composite antenna is completely filled. However, the intensity is reduced because the radiating area of the antenna is only a fraction of the total area. This combination of sub-apertures produces an ideal diffraction pattern. With a ten kilometer diameter composite antenna, the diffraction ripple skirt will extend much less than a kilometer and will be mostly captured by the rectenna.

Outside this central region is a greatly extended skirt of randomly fluctuating very low intensity illumination. The extent of this skirt is governed by the size of the sub-apertures and by a random walk summation of the individual sub-aperture phases. The smaller the sub-aperture, the more extended will be the skirt. For a 15 meter diameter sub-aperture, at geosynchronous altitude, the skirt will form a gaussian intensity profile with a sigma value of 135 kilometers.

The peak power flux intensity of the PSF is proportional to $N^2$, where N is the number of sub-aperture antenna segments. Stone shows that the energy reaching the random skirt is proportional to N/2. The total energy loss from the PSF to the skirt is therefore proportional to $N(N-N/2)=N^2(1-0.5/N)$. The random skirt power loss factor, 0.5/N for $N=10^4$ power units, is too small to be of consequence.

Phase Error: If there are phase defects at different locations in the antenna, some radiated power will be subtracted from the PSF central lobe and thrown into its broadening. In the case of transmission from the power satellite down to a rectenna this can be a problem because it is desirable to make the rectenna cover as little land as possible consistent with safety.

The principal sidelobes are reasonable small with as much as a quarter wave aberration. Common practice among amateur telescope makers is to keep the random surface errors of a primary mirror to a quarter wave or less. This provides only a small broadening of the PSF with relatively little loss of resolution and little dimming of the image. Therefore keeping the power return signal phase errors to no more than a quarter wave is also a good rule of thumb to use in designing a segmented antenna constellation such as the example architecture. With phase conjugation, as explained above, this requires eighth wave timing, and Z-range time delay, precision (106 of FIG. 1).

We can assess the effect of a quarter wave random phase error on the PSF. Such an error results in a sixteenth of the total power being scattered away from the center of the PSF, and into slightly widening the central lobe. The peak intensity becomes 94% of the ideal, but none of the redistributed energy is lost because the width of the PSF, including its diffraction ripples, is still very much less than the diameter of the rectenna.

Constellation Balancing:

Given the foregoing factors, and the requirement for best economy, there will be an optimum configuration for the power unit constellation.

Several characteristics compete. The more power units in the constellation the smaller each of them can be and the cheaper they are to produce because of economies of scale in production.

On the other hand, the more power units the longer it will take to resynchronize their clocks when using only a single communication frequency. Given that the power units are in constant relative motion, the time needed to maintain phase coherence establishes a limit to the number of units in the constellation. The more power units the longer it takes to synchronize.

The diameter of the constellation is also in the competition. The larger this is the greater will be the relative motions and the more frequently must the clocks be synchronized. So, constellation diameter sets a limit to the number of power units that can be in a constellation, although the system remains linearly scalable.

With a given number of power units the larger the diameter of the constellation the smaller will be the width of the projected PSF, which is good given the multiplicity of compensating pilot transmitters within the rectenna (see below). All these factors must be balanced to determine the optimum SPS system.

Example Scaling: The example constellation has ten thousand power units spaced 460 meters apart in a ten kilometer diameter ball. The projected spacing onto the time reference surface of the power unit's antennas is 100 meters. The solar array on each power unit is 27 meters on a side and the power antenna diameter is 15 meters.

Let us consider what happens if we increase the number of power units to a hundred thousand, and then to a million. In these constellations the total number of TR modules remains the same, though there are correspondingly fewer of them on each power unit. As the number of power units increases the size of each of them correspondingly decreases. Although the total area of the solar panels and power antennas remains constant for the whole constellation their size on each power unit is correspondingly smaller. So, too, is the size of the bus. The smaller the size of each power unit, and larger the number of them, the greater the economies of scale in production that may be achieved. This is true even though the area of the solar panels and the number of TR modules remains the same. Orders of magnitude increase in production numbers means more automation in assembly and fewer manhours are therefore needed for a given power level system.

With a hundred thousand power units the volumetric spacing reduces to 215 meters and the projected spacing onto the time reference surface is 32 meters. The solar panel is 8.5 meters on a side and the diameter of the power antenna segment is 4.75 meters.

With a million power units, the volumetric spacing is 100 meters and the time reference surface spacing is 10 meters. The solar panel is 2.7 meters on a side and the power antenna segment diameter is 1.5 meters.

With the increased numbers the control unit becomes more complex because it has to range and time synchronize more units within the same restricted calibration interval. One way to increase the recalibration rate is to use multiple frequency channels for communicating range and synchronization timing. Multiple communication frequencies allow constellations with an arbitrary number of participants, at the expense of control unit complexity.

Power Beam Safety:

The rectenna size is governed by safety limits for incident microwaves. The U.S. Armed Forces safety limit for continuous microwave exposure is 10 mW/cm$^2$, or 100 W/m$^2$. An incident flux of $10^9$ watts would require a rectenna to be at least as large as $10^7$ square meters. This would involve a circular rectenna field on the ground to have a diameter substantially greater than 3.6 km to meet the safety standards. A uniformly illuminated rectenna with a diameter of 5 km should provide safe levels for wild life. This would drop the average flux to only about 50 watts per square meter. (In practice a non-equatorial rectenna would be elongated somewhat in the north-south direction, depending on its latitude.)

Distributing the Pilot Signal: The synthesized antenna of the constellation would ordinarily project a very narrow PSF in the far field. At a wavelength of 12.2 centimeters, a constellation 10 kilometers in diameter could produce a focused spot on the ground with a one sigma diameter of 0.4 kilometers. In conventional architectures the PSF from the Solar Power Satellite is attracted to the rectenna by a single pilot wave transmitter located at the center of the rectenna. With phase conjugation this antenna automatically focuses the return power wave. This would result in a peak irradiance flux of almost four kilowatts per square meter. This is far beyond the safety limit of 100 watts per square meter so this conventional solution is inappropriate. What is needed is a way to distribute the flux uniformly over the rectenna so as to meet the safety requirement.

A new SPS system pilot beam architecture gives nearly uniform low intensity coverage over the entire rectenna. Referring to FIG. 11, a new pilot beam architecture 1100 is illustrated. The novel architecture places a multitude of mutually coherent pilot transmitters 1102 in various locations within the area of a rectenna 1101. These transmitters would be spaced a fraction of a kilometer apart. All of the transmitters operate on the same frequency and are phase locked together. Each pilot transmitter contributes coherently to a microwave pilot wavefront 1103, but each with a different relative phase as explained below.

Polarization: As discussed in association with FIG. 4, for coherent summation of microwave return power signals (611 of FIG. 6) from the power units, all of the received signals must have the same polarization. For this to happen the pilot transmitters 1102 must all emit with the same polarization. A symmetry argument suggests that most likely this will be circular polarization.

Sidelobe Capture: The SPS power unit constellation phase conjugates the resulting complex microwave pilot beam wavefront 1103, and returns it to the rectenna. Because the return is phase conjugated, the return power wavefront will be partitioned to illuminate the locations of the various antennas 1102. In effect each of these pilot wave transmitters would attract back to themselves a portion of the total solar power beam. In this way the average flux on the rectenna would be reduced to meet the safety standards.

A major benefit of this arrangement is that almost all of the sidelobe energy will fall within the confines of the rectenna. This means that the system as a whole has greater tolerance of phase error. The sidelobe losses will not be too large as long as the power transmitted phase errors are kept below the equivalent of a quarter of the wavelength.

Relative Phasing the Pilot Transmitter Array: Multiple pilot wave transmitters, all operating on the same frequency and phase locked together, constitute an active phased array antenna. Although the antennas are phase locked they will not all have the same phase. There are two reasons for this: First, the direction of transmission 1103 will almost certainly not be perpendicular to the rectenna. Second, the outgoing pilot wavefront must be defocused so as to encompass the several kilometer diameter of the power unit constellation.

Direction: An SPS constellation is expected to be in an equatorial geosynchronous orbit at some longitude. The rectenna it is servicing will normally be at some latitude and possibly a different longitude. From the point of view of the rectenna the geosynchronous orbit SPS constellation will likely not be directly overhead. So a spatially progressive phase variation is necessary to direct the pilot wave towards the SPS constellation.

Defocus: At a wavelength of 12.2 centimeters a 5 kilometer diameter pilot beam antenna array will produce a too narrowly focused spot at the SPS constellation. It's two sigma diameter would only be 0.8 kilometers which is too small for a 10 kilometer wide constellation. Defocusing is required for the pilot beam to encompass the large constellation. This means that the individual pilot transmitters must have a phase adjustment so that the pilot beam is sufficiently defocused when it reaches the SPS constellation. This defocusing is equivalent to placing a virtual focus point a substantial distance below the surface of the Earth. So these antennas are technically in the Fresnel zone but the orbiting antenna system as a whole behaves as if the focused power return beam is in the Fraunhofer zone.

Time Marking: Key to establishing the geometry of a disarticulated SPS constellation is a time marking signal (111 of FIG. 1). In the preferred embodiment this signal is sent from only a single transmitter located at the geometric center of the rectenna.

Swallowing the Sidelobes: The multi-power unit constellation has a substantial advantage over the conventional architectures. Because the constellation's synthesized antenna is very large its focused PSF will be small and most of its sidelobes will be tucked in close to this narrow PSF. The practical effect is that with the multiantenna pilot signal most of the power return sidelobe energy should fall close to the various pilot antennas and therefore within the area of even the minimum diameter Armed Forces specified rectenna. A beneficial side effect is that a greater phase error can be tolerated. A good rule of thumb for tolerable phase error is about one quarter of a wavelength, or three centimeters, instead of the usual tenth wave variation. Even with a substantial phase error the power capture efficiency should be close to 100%.

Transportation to Geosynchronous Orbit:

To get from Low Earth Orbit (LEO) to Geosynchronous orbit (GEO) requires a four kilometer per second increase in velocity.

Since the example power units are capable of generating 167 kw from the sun, solar-electric propulsion from LEO to GEO is attractive. An existing experimental Hall-effect thruster using argon has a specific impulse of around 2500 seconds. Argon is the preferred working fluid because it is, by far, the least expensive noble gas. Modern Dewar technology provides liquid storage for substantially more than a month with the evaporate purposed as propellant.

A preliminary analysis suggests that the unfueled mass of a power unit for the example ten thousand unit constellation would be about 2900 kg. With an $I_{sp}$=2500 sec., the rocket equation mass ratio for $\Delta V$=4 km/sec is about 1.18. This means that less than 500 kg of propellant would be needed to get the power unit's fueled starting mass of 3400 kg from LEO to GEO with enough left over for orbital maneuvers.

With 167 kw of power available, the experimental Hall-effect thruster would deliver about 6.8 Newtons of force. Four km/s is the required $\Delta V$. A power unit with a mass of 2900+500=3400 kg, would take about 23 days to go from LEO to GEO if it were operating all the time in full sun shine. At the beginning of its voyage it will be partially eclipsed by the Earth so the transit time will probably be closer to 30 days.

APPENDIX

Digital CorrelationTracking: It is possible with digital processing to determine the time of arrival of a modulated signal with very great precision. Gradient structure in the waveform is essential. It is impossible to track patterns that are unchanging. The modulation reference pattern should have a strong gradient structure.

The received signal modulation pattern is detected and digitized and is then convolved with a prestored digitized reference version of the same modulation. The sampled reference pattern is keyed to a clock so that each sample occurs at a specific time. By convolving the received signal with the reference it is possible to very accurately determine the time of arrival of the received signal to a fraction of a sample interval.

The digitizing sampling rate in both cases must be the identical and must meet the Nyquist sampling criterion of at least two samples for the highest frequency in the modulation waveform.

The set of reference pattern digitized samples make up a vector. The same is true of the received signal samples. The sample spacing is defined as $\Delta X$. In general these two vectors will not be identical as the sampling of the two waveforms will have been taken at somewhat different locations in the common waveform.

The task of a tracking algorithm is to determine precisely what the offset is between the samples of the received signal and the samples of the prestored reference signal. This is accomplished by convolving the received signal pattern with the reference pattern. At each successive offset position of the received signal the correlation coefficient with respect to the reference patter is calculated. To first approximation the best positional match is found at the location with the greatest correlation coefficient. This gives a first order estimate of the time of arrival of the received signal. Then the principal and two adjacent correlation coefficients are used in an interpolation algorithm to give an even higher precision estimate of any remaining offset between the reference pattern and the received signal pattern.

Figure 12:
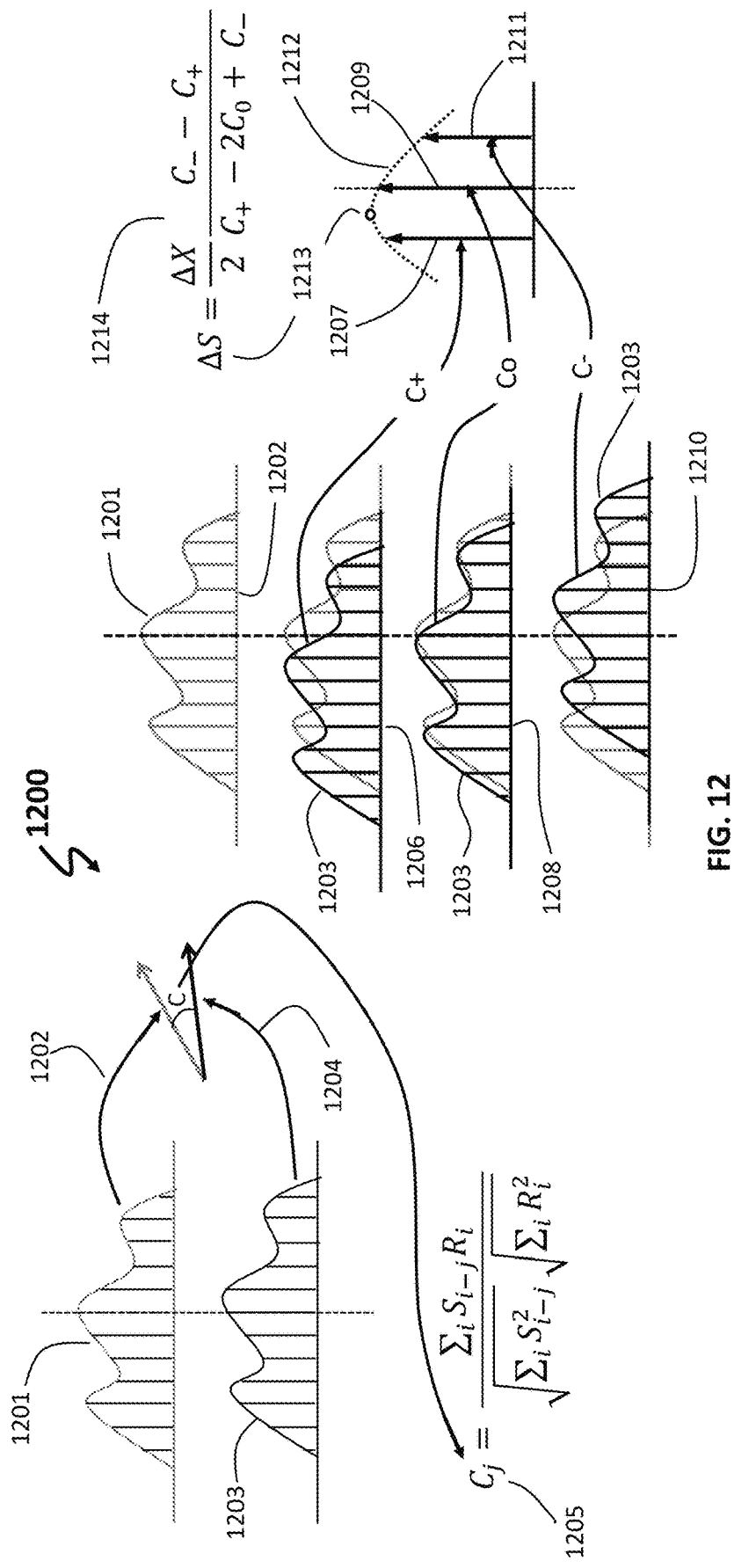
FIG. 12 provides a description of a precision correlation tracking algorithm.
Figure 13:
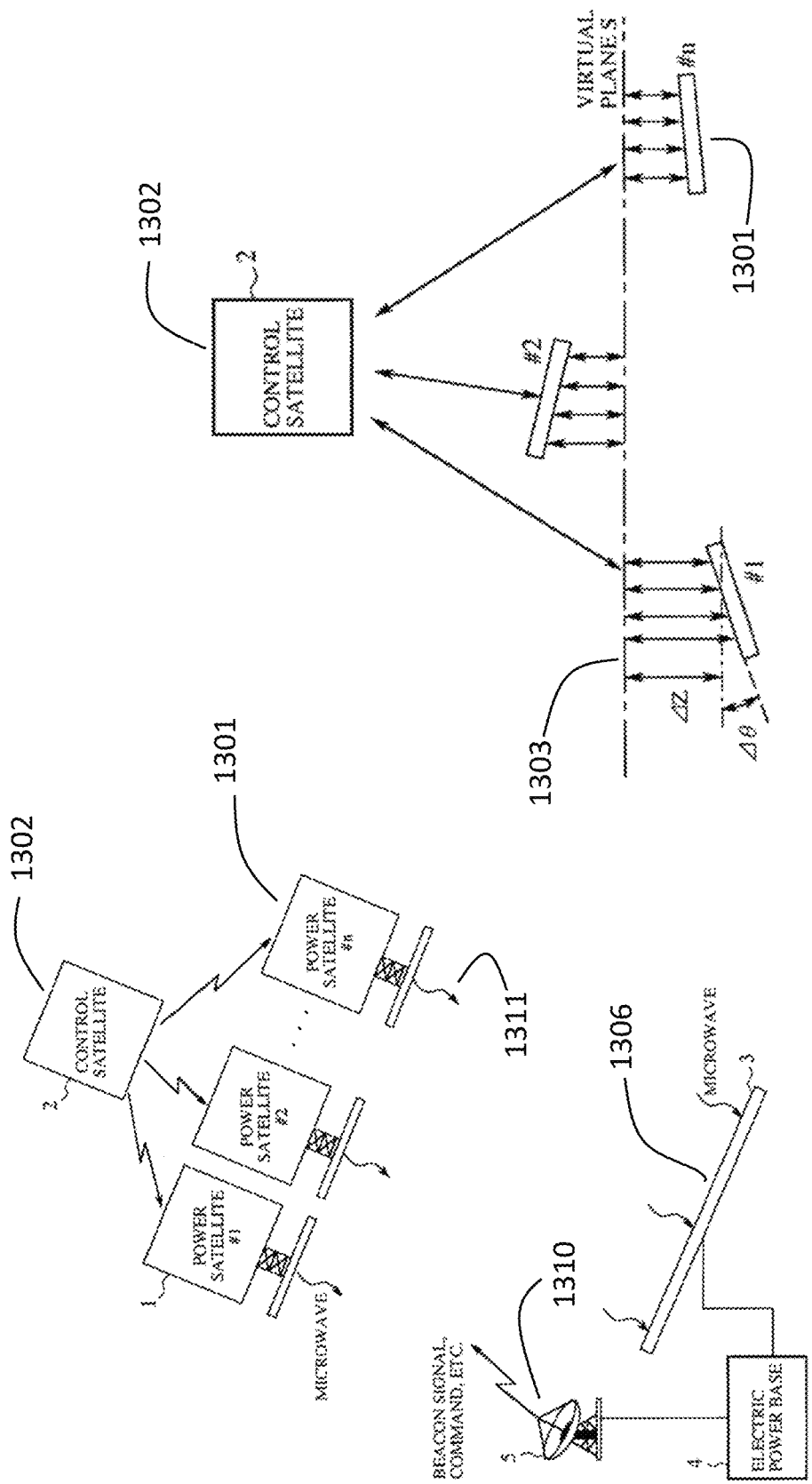
FIG. 13 is an illustration of the prior art of a formation of free flying power satellites.

Referring to FIG. 12 this convolution and correlation process 1200 is illustrated. In the figure are shown two samples of the same continuous modulation pattern. The reference pattern 1201 provides the master sample set which is interpreted as the vector 1202. The received signal 1203 is likewise sampled to produce a vector 1204. As shown, in general there will usually be a mismatch between the two vectors. One task is to find the correlation coefficient 1205 between these two vectors. As illustrated, the correlation coefficient is the dot product between the normalized versions of the two vectors. This coefficient is the same as the cosine of the angle between the two vectors.

FIG. 12 also shows the key portion of the convolution between the reference and the received signal. This is the region of best alignment between the two sample sets. This alignment region produces the greatest correlation coefficient 1209 resulting from the sample set 1208 being in a position which is most closely matched to the sample set 1202 taken from the reference waveform 1201. Flanking this best position of the received signal are two adjacent misalignments. Relative misalignment of the signal 1203 one sample distance to the left produces the sample set 1206 which results in the correlation coefficient 1207. When the signal 1203 is in best alignment with the reference pattern 1201 it gives the correlation coefficient 1209. With the signal 1203 misaligned one sample to the right, the sample set 1210 produces the correlation coefficient 1211.

There is further useful information in the relationships among these three principal correlation coefficients. It is possible to use these three to generate the equation for a parabola 1212. The offset location $\Delta S$ 1213 of the peak of this parabola is found by using the interpolation equation 1214. This virtual peak is the theoretically best estimate of the arrival time of the received signal 1203 with respect to the master reference signal 1201.

The error in the estimated arrival time decreases in reciprocal proportion to the total Signal-to-Noise Ratio ($\Delta S \approx 1/SNR$). For example, with a 100:1 signal to noise ratio the algorithm 1214 can directly measure the time displacement of a digitized signal to as little as a hundredth of a sample interval. Adding a Kalman Filter to average over a repeated sequence of these measurements can further reduce the time of arrival error to as little as a thousandth of a sample interval.

Practical Matters: A 10 Ghz A/D converter is commercially available which has 12 bit amplitude resolution. This A/D converter is a key enabling technology. The sample interval is $10^{-10}$ seconds. This sampling frequency is more than enough to Nyquist sample the example pilot wave carrier frequency of 2.45 Ghz.

At a $10^{-10}$ seconds sample interval light travels 3 centimeters between samples. One centimeter tracking requires interpolation between samples. The algorithm 1214 shows how to do this.

With 12 bit resolution the sampling signal to noise ratio (SNR) exceeds 1000 with a corresponding ability to resolve $10^{-13}$ seconds between zero noise samples. Thus the desired fractional sample displacement measurement of $10^{-11}$ seconds is readily obtained.

The design duration of the modulation waveform depends on the expected received modulation SNR. With high SNR, only a short duration modulation will be needed. If there is significant reception noise the modulation duration must be sufficiently long that a large number of samples must be captured to average out the noise. For example, a modulation that endures for a hundred samples will improve the received SNR by a factor of ten.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

The invention claimed is:

1. An antenna system, comprising:
   (a) an antenna element comprised of a master control unit and a plurality of antenna segments; and
   (b) a distant radio calibration source, wherein:
      i. the master control unit has a master clock, a master digital sampler, and a first type communication apparatus configured for selective communication between the master control unit and, individually, with each of the plurality of antenna segments, and a second type radio apparatus for communication with the distant radio calibration source,
      ii. each antenna segment of the plurality of antenna segments has a clock and a digital sampler and a first type communication apparatus configured for selective communication between the antenna segment and the master control unit, and a second type radio apparatus for radio communication with the distant calibration source,
      iii. the distant radio calibration source has a radio apparatus for radio communication with the master control unit and with the plurality of antenna segments;

(c) wherein the segmented antenna apparatus is configured for accurately determining a temporal and spatial structure of the segmented antenna apparatus using the distant radio calibration source, wherein:
  i. the master control unit is configured to selectively communicate with each antenna segment to measure a time delay and range distance between the master control unit and each antenna segment,
  ii. each antenna segment is configured to selectively communicate with the master control to measure a time delay and range distance between the master control unit and each antenna segment,
  iii. the clock and the digital sampler on each antenna segment are configured to synchronize with the master clock and the master digital sampler on the master control unit,
  iv. the master control unit is configured to establish a Time Reference Surface which is located at the master control unit perpendicular to a line-of-sight between the master control unit and the distant radio calibration source,
  v. the distant radio calibration source is configured to send a time marking radio signal to the master control unit and to each of the antenna segments,
  vi. the master control unit is configured to inform each antenna segment a time when the master control unit received the time marking radio signal,
  vii. each antenna segment is configured to compare a time at which the antenna segment receives the time marking signal with the time that the master control unit received the time marking signal, respectively, and
  viii. the antenna system is configured to use a time difference between the time the master control unit received the time marking signal and the time each antenna segment received the time marking signal, respectively, so as to compute a time delay and perpendicular distance between the antenna segment and the Time Reference Surface.

2. A method for calibrating antenna segments in the antenna system according to claim 1, comprising: bringing the clock and the digital sampler of each of the antenna segments into synchronization with the master clock and the master digital sampler of the master control unit whereby:
  (a) the time difference is periodically determined selectively between the master control unit and each antenna segment;
  (b) the master control unit sends the time difference measurement to a selected antenna segment along with a current clock time of the master control unit and a clock controlled digital sampler timing of the master control;
  (c) the selected antenna segment uses the time difference measurement, and the current clock time of the master control unit received to synchronize the clock and a digital sampler timing of the selected antenna segment to the master clock and the master digital sampler timing of the master control unit;
  (d) wherein the time difference measurement, and the synchronized clock and digital sampler timing, of the selected antenna segment is such that a radio signal emission from the selected antenna segment to a far field has a phase error no more than ninety degrees with respect to an average phase of a collective simultaneous radio emissions from all of the antenna segments received at the far field destination.

3. The method according to claim 2 further comprising delivering antenna segment signals transmitted to the far field destination, wherein:
  (a) phase control and timing signals received from the distant radio calibration source is used to adjust a phase of antenna segment signals directed back towards the far field destination; and
  (b) antenna segment signals transmitted back toward the far field destination from each antenna segment have a propagation polarization that is the same.

4. The method according to claim 3, further comprising phase conjugating a microwave power transmission radio return signal from the distant radio calibration source and transmitting a return phase conjugated signal back to the distant radio calibration source.

5. The method according to claim 4, further comprising isolating the phase conjugated microwave power transmission radio return signal by creating the return phase conjugated signal, wherein the return phase conjugated signal is a different frequency from that of the distant radio calibration source.

6. The method according to claim 4, further comprising isolating the phase conjugated microwave power transmission radio return signal by creating the return phase conjugated signal, wherein the return phase conjugated signal is a harmonic frequency of the signal from the distant radio calibration source.

7. The method according to claim 4, further comprising isolating the phase conjugated microwave power transmission radio return signal by periodically interrupting the phase conjugated microwave power transmission radio return signal so that a frequency and a phase of the phase conjugated microwave power transmission radio return signal from the distant calibration source can be detected.

8. The method according to claim 3, further comprising: a constellation of separate orbiting satellites, traveling in formation, each satellite transmitting a coordinated power transmission microwave signal to the distant radio calibration source, wherein:
  (a) each orbiting satellite comprises a solar power unit receiving energy from the sun and sending a portion of the energy from the sun to a distant common receiver using power transmission radio microwaves, wherein each solar power unit is a self-contained physically independent structure, comprising
    i. a bus to provide orientation, propulsion, electrical management, local communications,
    ii. one or more microwave radio receivers and transmitters configured to receive and transmit signals from and to multiple remote sources,
    iii. solar cells for collecting energy from the sun and converting it to electricity, and
    iv. a microwave radio transmitter and antenna for transmitting a portion of the collected energy to a distant receiving antenna;
  (b) each solar power unit receiving a microwave radio signal from the distant radio calibration source and returning a high-power microwave beam directly back to the distant receiving antenna; and
  (c) one orbiting satellite of the constellation of separate orbiting satellites serves as the master control unit.

9. The method according to claim 8, thermally protecting a power transmitting antenna for each orbiting satellite with a sunshade apparatus, wherein the sunshade comprises an optically opaque but electrically transparent fabric for shading the power transmitting antenna from the sun.

10. The method according to claim 3, further comprising:
(a) distributing one or more pilot microwave transmitters within the far field destination, wherein the far field destination is an area of a power receiving antenna;
(b) emitting microwave signals to all pilot transmitters within the power receiving antenna, wherein each microwave signal is mutually coherent with a frequency and a polarization that is the same, but are independently phase adjusted;
(c) periodically emitting the timing signal from only one pilot transmitter located at a center of the power receiving antenna, for determining a precise spatial location of the constellation of multiple transmitters.

* * * * *